(12) United States Patent
Watanabe et al.

(10) Patent No.: US 6,734,908 B1
(45) Date of Patent: May 11, 2004

(54) CORRELATED DOUBLE SAMPLING CIRCUIT AND AMPLIFICATION TYPE SOLID STATE IMAGING DEVICE EMPLOYING THE SAME

(75) Inventors: Takashi Watanabe, Souraku-gun (JP); Eiji Koyama, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/538,713

(22) Filed: Mar. 30, 2000

(30) Foreign Application Priority Data

Mar. 30, 1999 (JP) ............................. 11-088833
Feb. 25, 2000 (JP) ........................ 2000-049505

(51) Int. Cl.$^7$ .............................................. H04N 3/14
(52) U.S. Cl. .................. 348/308; 348/241; 250/208.1
(58) Field of Search ............................ 348/300, 302, 348/303, 305, 304, 306, 307, 308, 309, 310, 281, 301; 250/208.1

(56) References Cited

U.S. PATENT DOCUMENTS

| 4,886,986 A | 12/1989 | Watanabe ................... 307/353 |
| 5,793,423 A | * 8/1998 | Hamasaki ................... 348/302 |
| 5,856,686 A | * 1/1999 | Watanabe et al. ........... 357/291 |
| 6,300,978 B1 | * 10/2001 | Matsunaga et al. ......... 348/308 |

FOREIGN PATENT DOCUMENTS

| GB | 2 035 746 | 6/1980 |
| GB | 2 318 473 | 4/1998 |
| JP | 5-316338 | 11/1993 |
| JP | 10-145681 | 5/1998 |
| JP | 10-173997 | 6/1998 |
| WO | WO 98/24092 | 6/1998 |

\* cited by examiner

*Primary Examiner*—Ngoc-Yen Vu
*Assistant Examiner*—Heather R. Long
(74) *Attorney, Agent, or Firm*—David G. Conlin; David A. Tucker; Edwards & Angell, LLP

(57) ABSTRACT

A correlated double sampling circuit that remarkably suppresses a fixed pattern noise and an amplification type solid state imaging device employing the circuit are provided. An input changeover switch 200 is switched to the vertical signal line 145 side in a first period, and the signal of the vertical signal line 145 is clamped by first clamping circuit (201, 202) in the first half of the first period. Thereafter, a signal on the output side of the clamping capacitor 201 is sampled and held by first sample hold circuit (203, 204) in the last half of the first period. Next, the input changeover switch 200 is switched to the fixed potential side in a second period, and the clamping potential is sampled and held by the first clamping circuit with respect to a fixed potential in the first half of the second period. Thereafter, a signal on the output side of the clamping capacitor 201 is sampled and held by the first sample hold circuit. Then, a difference between the signals sampled and held before and after the second sample hold operation executed by the first sample hold circuit is taken.

12 Claims, 17 Drawing Sheets

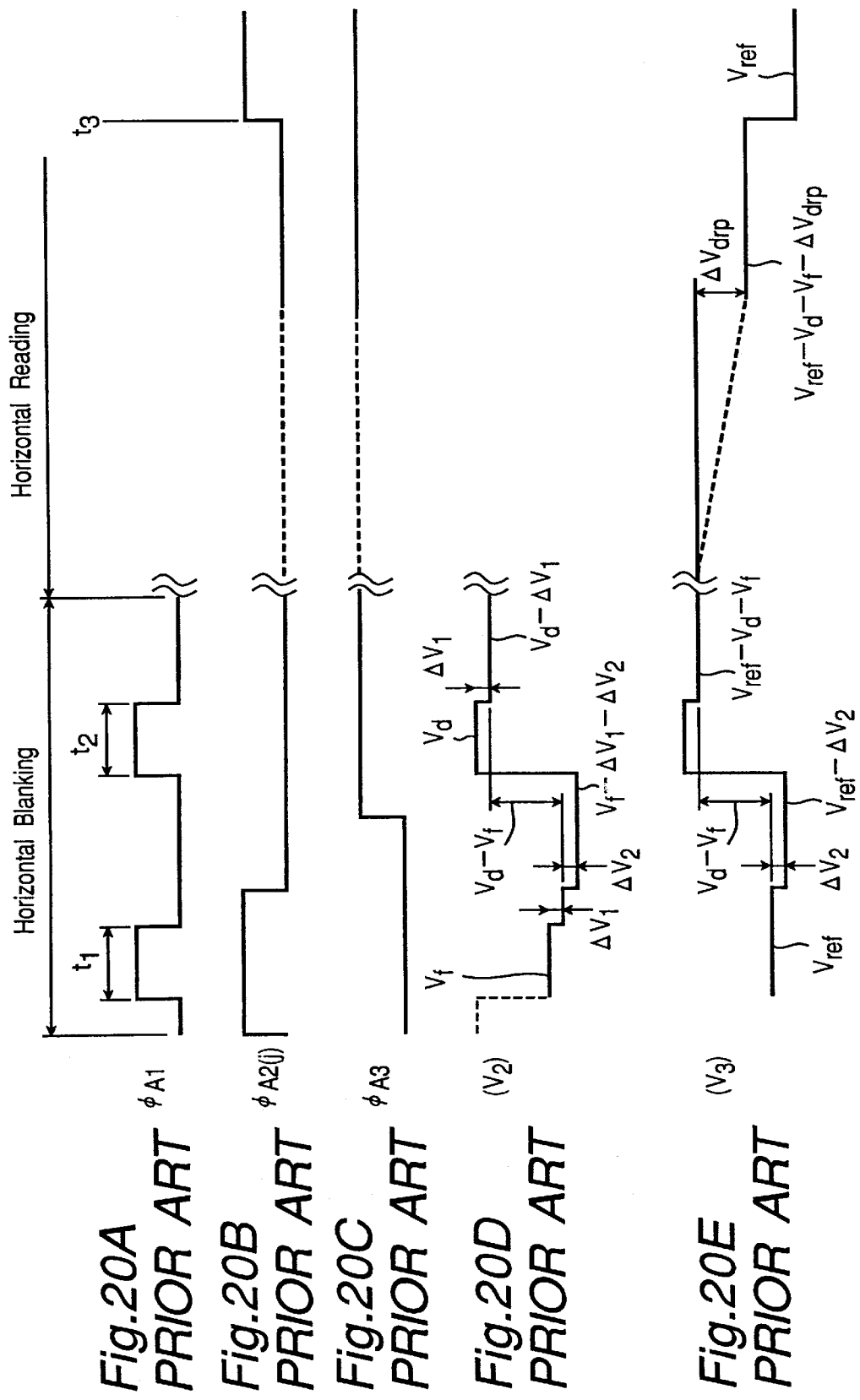

US 6,734,908 B1

CORRELATED DOUBLE SAMPLING CIRCUIT AND AMPLIFICATION TYPE SOLID STATE IMAGING DEVICE EMPLOYING THE SAME

BACKGROUND OF THE INVENTION

The present invention relates to a correlated double sampling circuit having a clamping circuit and a sample hold circuit and to an amplification type solid state imaging device employing the correlated double sampling circuit.

Conventionally, as an amplification type solid state imaging device, there has been proposed one that does not read a signal charge itself generated in each pixel but operates to convert the signal charge into a voltage signal (or a current signal) inside the pixel, amplify the signal and thereafter read the voltage signal (or the current signal) by means of a scanning circuit. The pixel section of this amplification type solid state imaging device is classified into a horizontal type in which a photoelectric conversion section and an amplifying section are arranged in a planar style and a vertical type in which a photoelectric conversion section and an amplifying section are arranged in a cubic style.

As an amplification type solid state imaging device of the aforementioned horizontal type, there is known one of the APS (Active Pixel Sensor) type shown in FIG. 14. Referring to FIG. 14, a signal charge generated in a photoelectric conversion section 101 is transferred to a gate of a transistor 103 via a transistor 102 to a gate of which a voltage $\phi_T$ is applied and made to be a voltage signal. The transistor 103 executes impedance conversion (current amplification) to read a signal $V_{sig}$ via a pixel selecting switch 104 to a gate of which a voltage $\phi_X$ is applied. Immediately before or after reading this signal $V_{sig}$, the signal charges accumulated in the gate of the transistor 103 are discharged to a power voltage $V_D$ side by a reset transistor 105 to a gate of which a voltage $\phi_R$ is applied.

As an amplification type solid state imaging device of the vertical type, one of the CMD (Charge Modulation Device) type shown in FIG. 15 is known. Referring to FIG. 15, in a transistor 111, signal charges generated through the photoelectric conversion are accumulated under the gate. Subsequently, by applying a read voltage $\phi_X$ to the gate of the transistor 111, a change in the characteristics of the transistor 111 due to the signal charges is read as the output signal $V_{sig}$. Thus, the transistor 111 executes the photoelectric conversion, amplification and pixel selection. A reset operation is achieved by discharging the signal charges to the substrate side with a voltage $\phi_R$ that is sufficiently higher than in the reading stage applied to the gate. Therefore, a three-valued voltage pulse $\phi_X/\phi_R$ is necessary for driving.

The pixel section of each of the aforementioned amplification type solid state imaging devices shown in FIG. 14 and FIG. 15 is represented by a common schematic diagram as shown in FIG. 16. In FIG. 16, the reference numeral 131 denotes a pixel section for executing the operations of photoelectric conversion, reading and resetting. The reading of the pixel section 131 is controlled by the voltage $\Phi_X$ of a signal line 106, and the resetting is controlled by the voltage $\Phi_R$ of a signal line 107. Then, the pixel section 131 outputs the amplified signal $V_{sig}$ via a vertical signal line 108.

FIG. 17 shows a schematic view of an amplification type solid state imaging device (two-dimensional image sensor) employing the aforementioned pixel section. Referring to FIG. 17, a two-dimensional pixel region 140 is constructed of the pixel sections 131, a first vertical scanning circuit 141 and a second vertical scanning circuit 142. The read operation of the pixel section 131 is controlled by a signal 143 from the first vertical scanning circuit 141, while the resetting operation is controlled by a signal 144 from the second vertical scanning circuit 142. An output signal of the pixel section 131 is outputted to a vertical signal line 145 and thereafter conducted to a correlated double sampling circuit provided for each vertical signal line 145. A difference between a light-receiving signal obtained in a reading stage and a reference signal after the resetting is outputted from the correlated double sampling circuit. In is herein noted that the light-receiving signal and the reference signal possibly take either one of two cases depending on which one comes first. According to the output of the difference, the variation in a threshold value per pixel section 131 is canceled, by which a fixed pattern noise (referred to as FPN hereinafter) of each pixel section 131 is suppressed. It is to be noted that the aforementioned correlated double sampling circuit is constructed of a clamping circuit (a clamping capacitor 146 and a clamping switch 147) and a sample hold circuit (a sample hold switch 148 and a sample hold capacitor 149).

In the aforementioned correlated double sampling circuit, the vertical signal line 145 is connected to the sample hold switch 148 via the clamping capacitor 146 and connected to a clamping potential $V_{CP}$ via the clamping switch 147. The clamping operation to the clamping potential $V_{CP}$ is executed by making a pulse $\phi_{C1}$ have high level in the reading stage of the light-receiving signal from the pixel section 131. The sample hold operation is executed by making a pulse $\phi_{S1}$ have high level in the reading stage of the reference signal from the pixel section 131. Then, the signal from the sample hold switch 148 is held in the sample hold capacitor 149 and amplified by an amplifier circuit 155. The signal amplified by the amplifier circuit 155 is conducted to a horizontal signal line 164 via a horizontal selection switch 156 controlled by a signal 161 from a horizontal scanning circuit 160, while the horizontal signal line 164 outputs a signal OS via an amplifier circuit 169.

As described above, according to the amplification type solid state imaging device (two-dimensional image sensor) shown in FIG. 17, the correlated double sampling circuit provided for each vertical signal line 145 suppresses the FPN caused by the variation in the threshold value per pixel section 131. However, the amplifier circuit 155 provided for each vertical signal line 145 is accompanied by variations in an offset level and gain. The variations, which are random in the horizontal direction and common in the vertical direction of the image, causes a significant vertical-stripe-shaped FPN in terms of a video image, significantly impairing the image quality. Furthermore, the horizontal selection switch 156 is accompanied by variations in conductance, and this becomes a factor of the vertical-stripe-shaped FPN.

As a method for solving the aforementioned vertical-stripe-shaped FPN, there has been proposed the amplification type solid state imaging device (two-dimensional image sensor) shown in FIG. 18 (Japanese Patent Laid-Open Publication No. HEI 10-173997). In this amplification type solid state imaging device, the two-dimensional pixel region has the same construction as the pixel region 140 shown in FIG. 17, and therefore, neither drawing nor description is provided for the region. The correlated double sampling circuit provided for each vertical signal line 145 has the same construction as that shown in FIG. 17. A difference to the amplification type solid state imaging device shown in FIG. 17 is that the amplifier circuit 155 provided for each vertical signal line 145 has two inputs, one being a signal 153 from the correlated double sampling circuit and the other being a reference voltage signal $V_{ref}$. Furthermore, a second CDS (correlated double sampling) circuit 168 is provided at the terminal of the horizontal signal line 164.

In the amplification type solid state imaging device (two-dimensional image sensor) having the aforementioned construction, signals from the amplifier circuits 155 are sequentially read to the horizontal signal line 164 by the switches 156 driven by a pulse $\phi_H(j)$ or the like from the horizontal scanning circuit 160. It is to be noted that the input of the amplifier circuit 155 is switched from the signal 153 to the reference signal 154 somewhere in each reading period. Therefore, on the horizontal signal line 164, the signal of the vertical signal line 145 and the reference signal are sequentially obtained in pairs. The variations in the characteristics of the amplifier circuits 155 and the horizontal selection switches 156 commonly exist in the each of these pairs of signals. Therefore, if a difference between the signal of the vertical signal line 145 and the reference signal is taken by a second CDS circuit 168, then there is obtained the net signal component from which the difference in characteristics between the amplifier circuits 155 and the horizontal selection switches 156 are removed. With this arrangement, the vertical-stripe-shaped FPN is prevented.

However, in the case of the amplification type solid state imaging device (two-dimensional image sensor) shown in FIG. 18, there are the problems as follows. That is, the clamping switch 147 provided for each vertical signal line 145 has a slight variation in the characteristics thereof. Therefore, the feedthrough level in the clamping operation stage varies every vertical signal line 145. Furthermore, the sample hold switch 148 provided for each vertical signal line 145 also has a slight variation in the characteristics. Therefore, the feedthrough level in the sample hold operation stage also varies every vertical signal line 145. The variations in the feedthrough level become the factors that cause the vertical-stripe-shaped FPN.

In view of the above, as another method for solving an aforementioned vertical-stripe-shaped FPN, there is proposed an amplification type solid state imaging device (two-dimensional image sensor) shown in FIG. 19 (Japanese Patent Laid-Open Publication No. HEI 10-145681). As shown in FIG. 19, a pair of capacitors 191 and 192 are connected to each vertical signal line 145 via a switch 190, and the other end (output terminal) of each of the capacitors 191 and 192 is connected to the reference voltage $V_{ref}$ via switches 193 and 194. The output terminal of the capacitor 191 is branched and inputted to the amplifier circuit 155. The signal from the amplifier circuit 155 is controlled by the pulse signal 161, i.e., $\Phi_H(j)$, the pulse signal 162, i.e., $\Phi_{A2}(j)$ and so on from the horizontal scanning circuit 160 and sequentially outputted to the horizontal signal line 164. Subsequently, only the net signal component is obtained by the second CDS circuit 168.

FIGS. 20A through 20E show timing charts for explaining the operation of the amplification type solid state imaging device shown in FIG. 19. It is to be noted that the following description is based on the condition that the light-receiving signal comes first and the reset signal comes later. By turning on the switch 193 and turning on the switch 190 (shown in FIGS. 20A and 20B) at a time $t_1$ within a horizontal blanking period, the potential of a portion $(V_2)$ becomes a light-receiving signal $V_f$ of the pixel element (shown in FIG. 20D), and the potential of a portion $(V_3)$ becomes $V_{ref}$ (shown in FIG. 20E). Subsequently, by sequentially turning off the switches 190 and 193, the $(V_2)$ potential becomes $V_f - \Delta V_1 - \Delta V_2$, while the $(V_3)$ potential becomes $V_{ref} - \Delta V_2$ (shown in FIGS. 20D and 20E). It is to be noted that $\Delta V_1$ is the feedthrough level of the switch 190 at $(V_2)$, and $\Delta V_2$ is the feedthrough level of the switch 193 at $(V_3)$. Through the above operations, the capacitor 191 holds the following voltage:

$$(V_f - \Delta V_1 - \Delta V_2) - (V_{ref} - \Delta V_2) = V_f - V_{ref} - \Delta V_1.$$

Subsequently, by turning on the switch 194 and turning on the switch 190 at a time $t_2$ within the horizontal blanking period (shown in FIGS. 20A and 20C), the potential at the $(V_2)$ portion becomes a reset signal $V_d$ of the pixel and thereafter $V_d - \Delta V_1$ if the switch 190 is turned off. In this case, the potential at the $(V_3)$ portion is floating in terms of direct current, and therefore, the potential at the $(V_3)$ portion is shifted from the $(V_2)$ voltage by a voltage difference retained in the capacitor 191 and becomes the following voltage:

$$(V_d - \Delta V_1) - (V_f - V_{ref} - \Delta V_1) = V_{ref} + (V_d - V_f).$$

That is, the feedthrough level $\Delta V_1$ of the switch 190 is canceled, as a consequence of which the net valid signal $V_d - V_f$, or the difference between the light-receiving signal $V_f$ of the pixel element and the reset signal $V_d$ is obtained as a value with the reference voltage signal $V_{ref}$ added.

However, the amplification type solid state imaging device shown in FIG. 19 has the following problems. That is, the pixel signal is retained in the input of the amplifier circuit 155 and the region continued from the input while the pixel signal of one horizontal line is read. The period of this retention is distributed throughout the period during which the horizontal scanning circuit 160 scans, the period being short in the first pixel and long in the final pixel. Therefore, if a leak current exists in the input region of the amplifier circuit 155, then the retention voltage is lowered by $\Delta V_{drp}$, and this value becomes small in the first pixel and great in the final pixel. That is, in the output signal, a shading-like nonuniformity that is distributed from the left-hand side to the right-hand side of the screen occurs. This also becomes a sort of FPN that significantly impairs the image quality. There somewhat exist a difference between a pair of capacitor 191 and capacitor 192 and a difference between a pair of switch 193 and switch 194, meaning that they are not completely equivalent to each other. Therefore, in the actual operation, a slight variation occurs every vertical signal line 145, meaning that the FPN does not completely disappear.

SUMMARY OF THE INVENTION

Accordingly, the object of the present invention is to provide a correlated double sampling circuit that can provide an amplification type solid state imaging device capable of remarkably reducing FPN that accompanies horizontal pixel selection, reducing shading-shaped nonuniformity and obtaining a high-quality image free of FPN with a simple construction and provide an amplification type solid state imaging device employing the circuit.

In order to achieve the aforementioned object, the present invention provides a correlated double sampling circuit comprising:

an input changeover switch that has one input terminal connected to a signal line and the other input terminal receiving a fixed potential and selects and outputs either a signal of the signal line or the fixed potential;

a first clamping means having a clamping capacitor that has one terminal on an input side connected to an output terminal of the input changeover switch and a clamping switch that has one terminal connected to the other terminal on an output side of the clamping capacitor and the other terminal to which a clamping potential is applied;

a first sample hold means having a sample hold switch that has one terminal connected to the terminal of the output side of the clamping capacitor and a sample hold capacitor that has one terminal connected to the other terminal of the sample hold switch; and a control means for controlling the input changeover switch, the clamping switch and the sample hold switch so as to switch the input changeover switch to the signal line side in a first period, clamp the signal of the signal line in a first half of the first period by the first clamping means, thereafter sample and hold a signal on the output side of the clamping capacitor in the latter half of the first period by the first sample hold means, switch the input changeover switch to the fixed potential side in a second period subsequent to the first period, sample and hold the clamping potential on the output side of the clamping capacitor by the first clamping means with respect to the fixed potential in the first half of the second period and thereafter sample and hold a signal on the output side of the clamping capacitor by the first sample hold means.

According to the above correlated double sampling circuit, the net signal is obtained as a difference between the first half signal and the latter half signal in the sample hold capacitor through the first correlated double sampling operation (referred to as a CDS operation hereinafter) by the first clamping means and the first sample hold means in the first period during which the input changeover switch is switched to the signal line side. Next, the reference signal including the same feedthrough level as that of the first CDS operation is obtained by in the sample hold capacitor through the second CDS operation by the first clamping means and the first sample hold means in the second period during which the input changeover switch is switched to the fixed potential side. Therefore, by subsequently taking the difference between the signals held in the sample hold capacitor before and after the second sample hold operation, there is obtained only the net signal component in which all the feedthrough levels generated through the CDS operation are removed. Therefore, by applying this correlated double sampling circuit to an amplification type solid state imaging device, the FPN accompanying the horizontal pixel selection can be remarkably reduced with a simple construction and the shading-like nonuniformity can be reduced, allowing a high-quality image free of FPN to be obtained.

In one embodiment, a capacitance of the clamping capacitor is ten or more times greater than a capacitance of the sample hold capacitor.

According to the above correlated double sampling circuit, the capacitance of the clamping capacitor is made ten or more times greater than the capacitance of the sample hold capacitor. With this arrangement, the gain in the case where the signal obtained through the clamping capacitor is accumulated in the sample hold capacitor can be increased.

In one embodiment, the clamping switch and the sample hold switch are each comprised of a MOS transistor, and a ratio of a sum of areas of a junction section of the clamping switch and a junction section of the sample hold switch respectively connected to the clamping capacitor with respect to the capacitance of the clamping capacitor is substantially equal to a ratio of an area of a junction section of the sample hold switch connected to the sample hold capacitor with respect to the capacitance of the sample hold capacitor.

According to the above correlated double sampling circuit, the ratio of a sum of areas of a junction section of the clamping switch and a junction section of the sample hold switch respectively connected to the clamping capacitor with respect to the capacitance of the clamping capacitor is made substantially equal to the ratio of an area of a junction section of the sample hold switch connected to the sample hold capacitor with respect to the capacitance of the sample hold capacitor. With this arrangement, an equal reduction in potential due to the leak current of the MOS transistors occurs on the signal line between the clamping capacitor and the sample hold capacitor and the signal line on the output side of the sample hold capacitor. Therefore, the reduction in potential due to the leak current of the MOS transistor can be reliably removed through the aforementioned CDS operation.

One aspect of the present invention provides an amplification type solid state imaging device that has a photoelectric conversion means, an amplification type pixel element for amplifying and outputting a light-receiving signal formed by the photoelectric conversion means and a reference signal that serves as a reference of the light-receiving signal, a vertical signal line to which an output of the pixel element is connected, an amplifying means for amplifying a signal of the vertical signal line and a horizontal signal line to which an output of the amplifying means is connected via a horizontal selection switch and transmits the signal of the pixel element to the horizontal signal line via the vertical signal line, the amplifying means and the horizontal selection switch, the amplification type solid state imaging device comprising:

the correlated double sampling circuit provided between the vertical signal line and the amplifying means.

According to the above embodiment, the difference between the light-receiving signal of the pixel element and the reference signal is obtained on the input side of the amplifying means of each vertical signal line through the first CDS operation by the first clamping means and the first sample hold means of the correlated double sampling circuit in the first period. Thereafter, the reference signal including the same feedthrough level as that of the first CDS operation is obtained on the input side of the amplifying means through the second CDS operation by the first clamping means and the first sample hold means in the second period. Therefore, by subsequently taking the difference between the differential signal and the reference signal at the terminal of the horizontal signal line through the CDS operation, there is obtained only the net signal component in which all the feedthrough levels are canceled. Therefore, the FPN accompanying the horizontal pixel selection can be remarkably reduced with a simple construction and the shading-like nonuniformity can be reduced, allowing an amplification type solid state imaging device capable of obtaining a high-quality image free of FPN to be achieved.

In one embodiment, the input changeover switch is switched to the vertical signal line in the first period; either one of the light-receiving signal of the pixel element or the reference signal is clamped in the first half of the first period by the first clamping means, thereafter a signal that represents a difference between the light-receiving signal from the pixel element and the reference signal by a quantity of change from the clamping potential is held on sample hold capacitor by sampling and holding the other one of the light-receiving signal of the pixel element and the reference signal in the latter half of the first period via the clamping capacitor by the first sample hold means, and the input changeover switch is switched to the fixed potential side in the second period, the clamping potential is sampled and held on the output side of the clamping capacitor by the first clamping means with respect to the fixed potential in the first half of the second period, thereafter a first output signal that represents a difference between the light-receiving signal from the pixel element and the reference signal by a quantity of change from the clamping potential is outputted to the horizontal signal line via the amplifying means in the first half of the period during which the horizontal selection switch is made conductive and the output signal of the amplifying means is read to the horizontal signal line, thereafter the signal on the output side of the clamping capacitor is sampled and held by the first sample hold means and a second output signal that becomes the clamping potential is outputted to the horizontal signal line via the amplifying means in the latter half of the period during which the horizontal selection switch is conductive after the sampling and holding.

According to the above amplification type solid state imaging device, the input changeover switch is switched to the signal line side in the first period, and either one of the light-receiving signal of the pixel element and the reference signal is clamped by the first clamping means in the first half of the first period. Next, the other one of the light-receiving signal of the pixel element and the reference signal in the latter half of the first period is sampled and held by the first sample hold means via the clamping capacitor, and the signal that represents the difference between the light-receiving signal from the pixel element and the reference signal by the quantity of change from the clamping potential is held in the sample hold capacitor. Thereafter, the input changeover switch is switched to the fixed potential side in the second period, and the clamping potential is sampled and held on the output side of the clamping capacitor by the first clamping means with respect to the fixed potential in the early stage of the second period. Next, the first output signal that represents the difference between the light-receiving signal from the pixel element and the reference signal by the quantity of change from the clamping potential is outputted to the horizontal signal line via the amplifying means in the first half of the period during which the horizontal selection switch becomes conductive to read the output signal of the amplifying means to the horizontal signal line. Thereafter, the signal on the output side of the clamping capacitor is sampled and held by the first sample hold means, and the second output signal that represents the clamping potential is outputted to the horizontal signal line in the latter half of the period during which the horizontal selection switch is conductive after the sample hold operation. By taking the difference between the thus obtained first and second output signals, the difference between the light-receiving signal and the reference signal can be obtained.

One embodiment comprises a second clamping means for clamping the first output signal out of a pair of first output signal and second output signal from the horizontal signal line and outputting a signal of difference between the first output signal and the second output signal in the period of outputting the second output signal; and a second sample hold means for sampling and holding the signal of difference from the second clamping means and outputting the signal of difference that has been sampled and held.

According to the above amplification type solid state imaging device, the signal of difference between a pair of first output signal and second output signal to be read on the horizontal signal line, i.e., the difference between the light-receiving signal from the pixel element and the reference signal can be obtained by the structure of the second clamping means and the second sample hold means. Therefore, a signal which represents an image free of FPN and from which all the variation components are removed can be obtained.

One embodiment comprises a third sample hold means for sampling and holding the first output signal out of a pair of first output signal and second output signal from the horizontal signal line;

a fourth sample hold means for sampling and holding the second output signal out of a pair of first output signal and second output signal from the horizontal signal line; and a calculating means for obtaining a signal of difference between the first output signal held by a third sample hold means and the second output signal held by a fourth sample hold means and outputting the signal of difference.

According to the above amplification type solid state imaging device, the signal of difference between a pair of first output signal and second output signal to be read on the horizontal signal line, i.e., the difference between the light-receiving signal from the pixel element and the reference signal can be obtained by the structure for taking the difference between the outputs of the third and fourth sample hold means by the calculating means. Therefore, a signal which represents an image free of FPN and from which all the variation components are removed can be obtained.

In one embodiment, the control means outputs a first control signal that is turned on in the latter half of the first period and a second control signal that is turned on in the period during which the horizontal selection switch becomes conductive within the second period, and the imaging device comprises:

a sample hold changeover switch that has one input terminal receiving the first control signal, the other input terminal receiving the second control signal and an output terminal connected to a control input terminal of the sample hold switch of the first sample hold means.

According to the above amplification type solid state imaging device, the sample hold changeover switch is switched to the first control signal side in the latter half of the first period, and the sample hold changeover switch is switched to the second control signal side in the period during which the horizontal selection switch becomes conductive within the second period. This arrangement allows the sample hold switch of the first sample hold means to be controlled for each of the vertical signal lines of which the horizontal selection switches are made sequentially conductive, with a simple construction.

In one embodiment, all the horizontal selection switches are conductive in a period during which the first sample hold means executes sampling and holding within the first period, and the horizontal selection switch connected to the first sample hold means is conductive in a period during which the first sample hold means samples and holds the signal on the output side of the clamping capacitor within the second period.

According to the above correlated double sampling circuit, the horizontal selection switch becomes conductive in the period during which the first sample hold means executes sampling and holding within both the first and second periods, and the output of the amplifying means is connected to the horizontal signal line via the horizontal selection switch. With this arrangement, the state on the load side of the first sample hold means becomes identical during the operation of the first sample hold means within the first and second periods, meaning that an identical operating condition is provided for each of the two operations. Therefore, FPN and shading-like nonuniformity can be more completely reduced.

In one embodiment, a constant current load that is connected to the horizontal signal line via a load connection switch is provided, and the load connection switch is off at least in a period during which all the horizontal selection switches are conductive.

According to the above correlated double sampling circuit, the load connection switch is turned off at least in the period during which all the horizontal selection switches are conductive, disconnecting the constant current source from the horizontal signal line. With this arrangement, no load current flows. Accordingly, there is generated no mutual interference even if a great difference in level exists between the outputs of the amplifying means. Therefore, a correct sample hold operation can be executed in each of the two operations without exerting any influence on the sample hold capacitor on the input side of the amplifying means, by which FPN and shading-like nonuniformity can be more completely reduced.

In one embodiment, all the horizontal selection switches are nonconductive at least in a period during which the first sample hold means executes sampling and holding within the first period, and the horizontal selection switch connected to the first sample hold means is nonconductive in a period during which the first sample hold means samples and holds the signal on the output side of the clamping capacitor within the second period.

According to the above correlated double sampling circuit, the horizontal selection switches become nonconductive when the first sample hold means executes sampling and holding within both the first and second periods, and the output of the amplifying means is not connected to the horizontal signal line via the horizontal selection switch. With this arrangement, the state on the load side of the first sample hold means becomes identical during the operation of the first sample hold means within the first and second periods, meaning that an identical operating condition is provided for each of the two operations. Therefore, FPN and shading-like nonuniformity can be more completely reduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 20A through 20E are charts for explaining the problems of a conventional amplification type solid state imaging device.

DETAILED DESCRIPTION OF THE PREFERRED EMBODIMENTS

Figure 1:
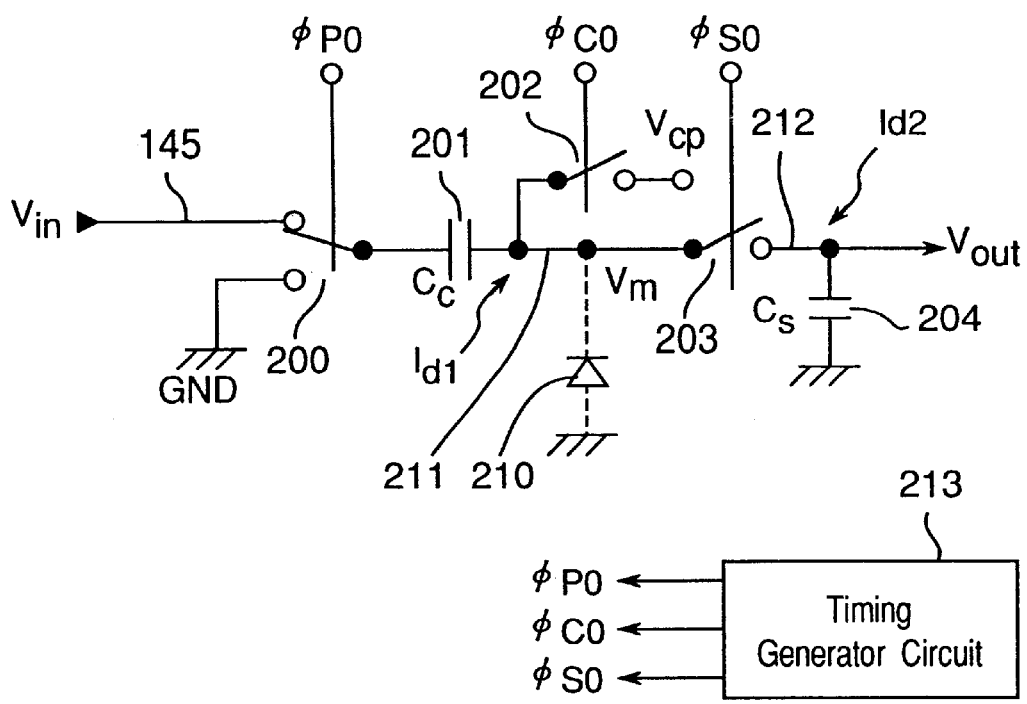
FIG. 1 is a circuit diagram of a correlated double sampling circuit according to a first embodiment of the present invention.
Figure 2:
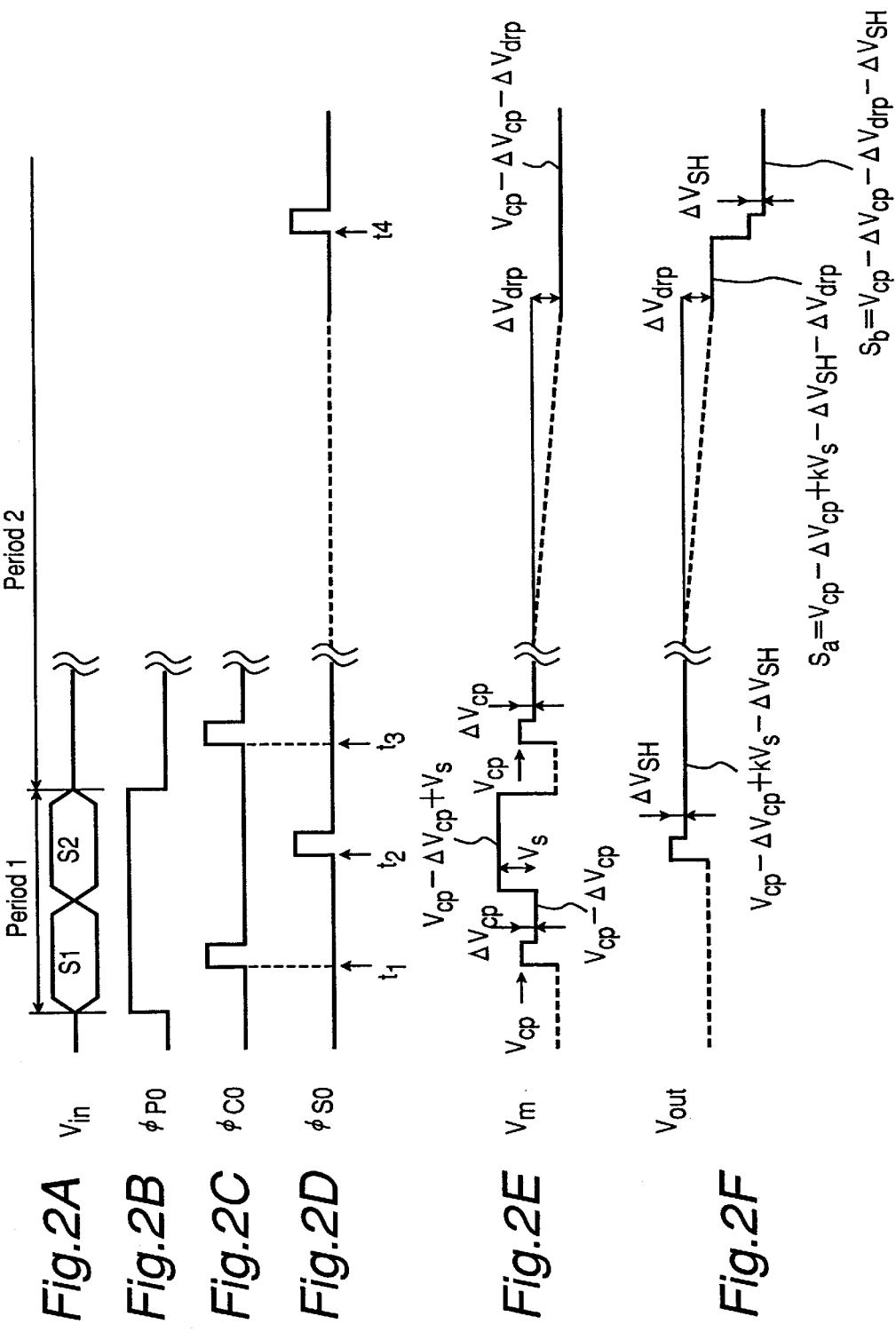
FIGS. 2A through 2F are timing charts of the above correlated double sampling circuit.

The correlated double sampling circuit of the present invention and the amplification type solid state imaging device employing the circuit will be described in detail below on the basis of the embodiments shown in the drawings.

First Embodiment

FIG. 1 shows a circuit diagram of a correlated double sampling circuit according to the first embodiment of the present invention. As shown in FIG. 1, this correlated double sampling circuit includes an input changeover switch 200 having one input terminal connected to a vertical signal line 145 and the other input terminal connected to a ground GND of a fixed potential, a clamping capacitor 201 having one terminal connected to the output terminal of the input changeover switch 200, a clamping switch 202 having one terminal connected to the other terminal of the clamping capacitor 201 and the other terminal connected to a clamping potential $V_{CP}$, a sample hold switch 203 having one terminal connected to the other terminal of the clamping capacitor 201 and a sample hold capacitor 204 connected between the other terminal of the sample hold switch 203 and the ground GND. The clamping capacitor 201 and the clamping switch 202 constitute a first clamping means, while the sample hold switch 203 and the sample hold capacitor 204 constitute a first sample hold means. The correlated double sampling circuit has a timing generator circuit 213 that serves as a control means for outputting a pulse $\phi_{PO}$, a pulse $\phi_{CO}$ and a pulse $\phi_{SO}$ and operates to control the switching of the input changeover switch 200 by the pulse $\phi_{PC}$, control the turning-on and -off of the clamping switch 202 by the pulse $\phi_{CO}$ and control the turning-on and -off of the sample hold switch 203 by the pulse $\phi_{SO}$. Then, an input signal $V_{in}$ of the vertical signal line 145 is retained in the sample hold capacitor 204 via the clamping capacitor 201 and the sample hold switch 203, and an output signal $V_{out}$ is outputted.

FIGS. 2A through 2F show the timing chart of the operation of the aforementioned correlated double sampling circuit. The operation of the correlated double sampling circuit will be described with reference to the timing charts of FIGS. 2A through 2F.

First, as shown in FIGS. 2A through 2F, by making the pulse $\phi_{PO}$ have high level in a period 1 of the first period (shown in FIG. 2B), the input side of the clamping capacitor 201 shown in FIG. 1 is connected to the vertical signal line 145 via the input changeover switch 200. Next, by making the pulse $\phi_{CO}$ (shown in FIG. 2C) have high level at a time $t_1$ within the first half (indicated by $S_1$ in FIG. 2A) of the input signal $V_{in}$, the clamping operation to the clamping potential $V_{CP}$ is executed. Then, by making the pulse $\phi_{SC}$ (shown in FIG. 2D) have high level at a time $t_2$ within the latter half (indicated by $S_2$ in FIG. 2A) of the input signal, a sample hold operation is executed. In this stage, the level of a signal $V_m$ of a signal line 211 on the output side of the clamping capacitor 201 becomes $V_{CP}-\Delta V_c$ (shown in FIG. 2E) due to the existence of the feedthrough level $\Delta V_{CP}$ of the clamping pulse $\phi_{CO}$. Subsequently, since the signal changes by $V_S$ ($V_S$ is a difference between the period $S_1$ and the period $S_2$ of the input signal $V_{in}$, representing the net signal component) via the clamping capacitor 201, the level of the signal $V_m$ of the signal line 211 is expressed by the equation:

$$V_m(t_2)=V_{CP}-\Delta V_{CP}+V_S \quad (1)$$

Due to the existence of a feedthrough level $\Delta V_{SH}$ of the sample hold pulse $\phi_{SU}$, the output signal $V_{out}$ obtained by sampling and holding the above level is expressed by the equation:

$$V_{out}(t_2+\alpha)=V_{CP}-\Delta V_{CP}+kV_S-\Delta V_{SH} \quad (2)$$

where k represents a gain when the signal that has passed through the clamping capacitor 201 (capacitance $C_c$) is accumulated in the sample hold capacitor 204 (capacitance $C_s$) and is expressed by the equation:

$$k=1-C_s/C_C \quad (3)$$

In other words, it is required to make the capacitance $C_C$ sufficiently greater than the capacitance $C_S$ in order to increase the gain, and the capacitance $C_C$ is normally made ten or more times greater than the capacitance $C_S$.

The signal of the above equation (2) is lowered by $\Delta V_{drp}$ (shown in FIG. 2F) by a leak current $I_{d2}$ on a signal line 212 (signal $V_{out}$) at a time $t_4$ at the second sample hold time.

Therefore, a first output signal $S_a$ obtained on the signal line 212 (signal $V_{out}$) immediately before a time $t_4$ is expressed by the equation:

$$S_a(t_4-\Delta t)=V_{CP}-\Delta V_{CP}+kV_S-\Delta V_{SH}-\Delta V_{drp} \quad (4)$$

(shown in FIG. 2F).

On the signal line 211, the input side of the input changeover switch 200 is grounded after the time $t_2$ and is clamped again at a time $t_3$, as a consequence of which $V_{CP}-\Delta V_{CP}$ is held on the output side of the clamping capacitor 201. In this case, $\Delta V_{CP}$, which is attributed to the clamping switch 202 quite similarly to the case of the equation (1), the equation (2) and the equation (4), has the same value as the value at the time $t_1$. Subsequently, a potential drop occurs by $\Delta V_{drp}$ due to the leak current $I_{d1}$ on the signal line 211 until the time $t_4$. Therefore, the potential of the signal $V_m$ on the signal line 211 at and around the time $t_4$ is expressed by the equation:

$$V_{CP}-\Delta V_{CP}-\Delta V_{drp}$$

(shown in FIG. 2E). By making the sample hold pulse $\phi_{SO}$ have high level at the time $t_4$, the feedthrough level $\Delta V_{SH}$ is added to a second output signal $S_b$ of the signal line 212 (signal $V_{out}$) immediately after the time $t_4$, satisfying the equation:

$$S_b(t_4+\Delta t)=V_{CP}-\Delta V_{CP}-\Delta V_{drp}-\Delta V_{SH} \quad (5)$$

(shown in FIG. 2F). In this case, $\Delta V_{SH}$, which is ascribed to the sample hold switch 203 quite similarly to the case of the equation (2) and equation (4), has the same value as the value at the time $t_2$. Therefore, a difference OS between the first output signal $S_a$ and the second output signal $S_b$ by a correlated double sampling circuit (not shown) provided for the signal line 212 (signal $V_{out}$) is expressed by the equation:

$$OS=S_a-S_b=kV_S \quad (6)$$

as a consequence of which a net signal $V_S$ from which the feedthrough level $\Delta V_{CP}$ of a clamping pulse and the feedthrough level $\Delta V_{SH}$ of a sample hold pulse as well as the potential drop $\Delta V_{drp}$ due to the leak current are removed is obtained with a noise reducing effect innately owned by the correlated double sampling circuit.

During the period between the time $t_3$ and the time $t_4$, the input changeover switches 200, 202 and 203 are all off, while the signal line 211 (signal $V_m$) and the signal line 212 (signal $V_{out}$) are isolatedly in the floating state. With regard to these isolated signal lines 211 and 212, the source of the MOS transistor constituting each of the switches 202 and 203 exists as a diode, and the junction leak of the diode becomes the leak current.

In order to completely remove the potential drop $\Delta V_{drp}$ due to the leak current, it is required to make the potential drop on the signal line 211 (signal $V_m$) and the potential drop on the signal line 212 (signal $V_{out}$) coincide. Assuming that the leak current on a signal line $V(x)$ is $I_d(x)$ and the capacitance is $c(x)$, then a potential drop $\Delta V(x)$ at a time t is expressed by the equation:

$$\Delta V(x)=I_d(x) \cdot t/c(x) \quad (7)$$

Figure 3:
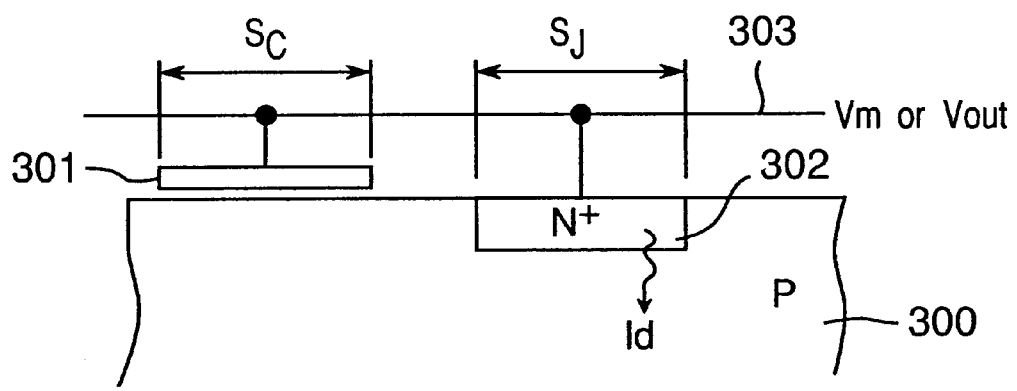
FIG. 3 is a view showing an areal relation of the signal line section of the above correlated double sampling circuit.

FIG. 3 shows an areal relation between the signal line portions for use in the aforementioned correlated double sampling circuit, where are shown a p-type semiconductor substrate 300, the gate 301 of a MOS transistor constituting each switch, the junction portion 302 of the MOS transistor and a signal line 303. As shown in FIG. 3, assuming that the junction area is $S_J(x)$ and the gate area is $S_G(x)$ and further assuming that a junction leak current per unit area is $a_1$, a junction capacitance per unit area is $b_1$ and the gate capacitance is $b_2$, then $I_d(x)$ and $C(x)$ are expressed by the equations:

$$I_d(x) = a_1 S_J(x) \tag{8}$$

$$C(x) = b_1 S_J(x) + b_2 S_G(x) \tag{9}$$

$$= (b_1 + b_2 c_o) S_J(x) \tag{10}$$

provided that $C_o = S_C(x)/S_J(x)$ \tag{11}

In the above case, $a_1$, $b_1$ and $b_2$ are generally constant values and $c_o$ is constant in terms of areal ratio, satisfying the equation:

$$\Delta V(x) = \text{constant} \tag{12}$$

according to the equation (7).

That is, if the ratio of the junction area to the gate area is made roughly equal to each other on the signal line 211 (signal $V_m$) and the signal line 212 (signal $V_{out}$), then the potential drops $\Delta V_{drp}$ can be completely cancelled. If the signal line 211 (signal $V_m$) has a smaller ratio of the junction area than the signal line 212 (signal $V_{out}$) in FIG. 1, then a dummy junction 210 (indicated by the dashed line) is required so as to make the ratio of the junction area to the gate area roughly equal to each other.

In addition, as understood from the equations (7) and (8), the potential drops $\Delta V_{drp}$ can be cancelled when the ratio of a sum of areas of a junction section of the clamping switch 202 and a junction section of the sample hold switch 203 respectively connected to the clamping capacitor 201 with respect to the capacitance $C_C$ of the clamping capacitor 201 is made substantially equal to the ratio of an area of a junction section of the sample hold switch 203 connected to the sample hold capacitor 204 with respect to the capacitance $C_S$ of the sample hold capacitor 204.

As described above, through the first CDS operation in the period 1 during which the input changeover switch 200 is switched to the vertical signal line 145 side, a net signal is obtained in the sample hold capacitor 204 as a difference between the first half period signal and the latter half period signal of the signal $V_{in}$ on the vertical signal line 145 side. Through the second CDS operation in the period 2, or the second period at which the input changeover switch 200 is switched to the fixed potential side, a reference signal including the same feedthrough level as that of the first CDS operation is obtained in the sample hold capacitor 204. Subsequently, by taking a difference between the signals held in the sample hold capacitor 204 before and after the second sample hold operation, only the net signal component from which all the feedthrough levels generated through the CDS operations are removed is obtained. Therefore, by applying this correlated double sampling circuit to an amplification type solid state imaging device, the FPN accompanying the horizontal pixel selection can be exceedingly reduced with a simple construction and the shading-like nonuniformity can be reduced, allowing a high-quality image free of FPN to be obtained.

By making the capacitance of the clamping capacitor 201 ten or more times greater than the capacitance of the sample hold capacitor 204, the gain when the signal obtained through the clamping capacitor 201 is accumulated in the sample hold capacitor 204 can be increased.

By making the ratio of the junction portion area relative to the gate portion area of the MOS transistor of the clamping switch 202 roughly identical to the ratio of the junction portion area relative to the gate portion area of the MOS transistor of the sample hold switch 203, the potential drops due to the leak currents of the MOS transistors are made identical on the signal line 211 (signal $V_m$) and the signal line 212 (signal $V_{out}$), as a consequence of which the potential drops due to the leak currents of the MOS transistors can be reliably cancelled through the CDS operation.

Second Embodiment

Figure 4:
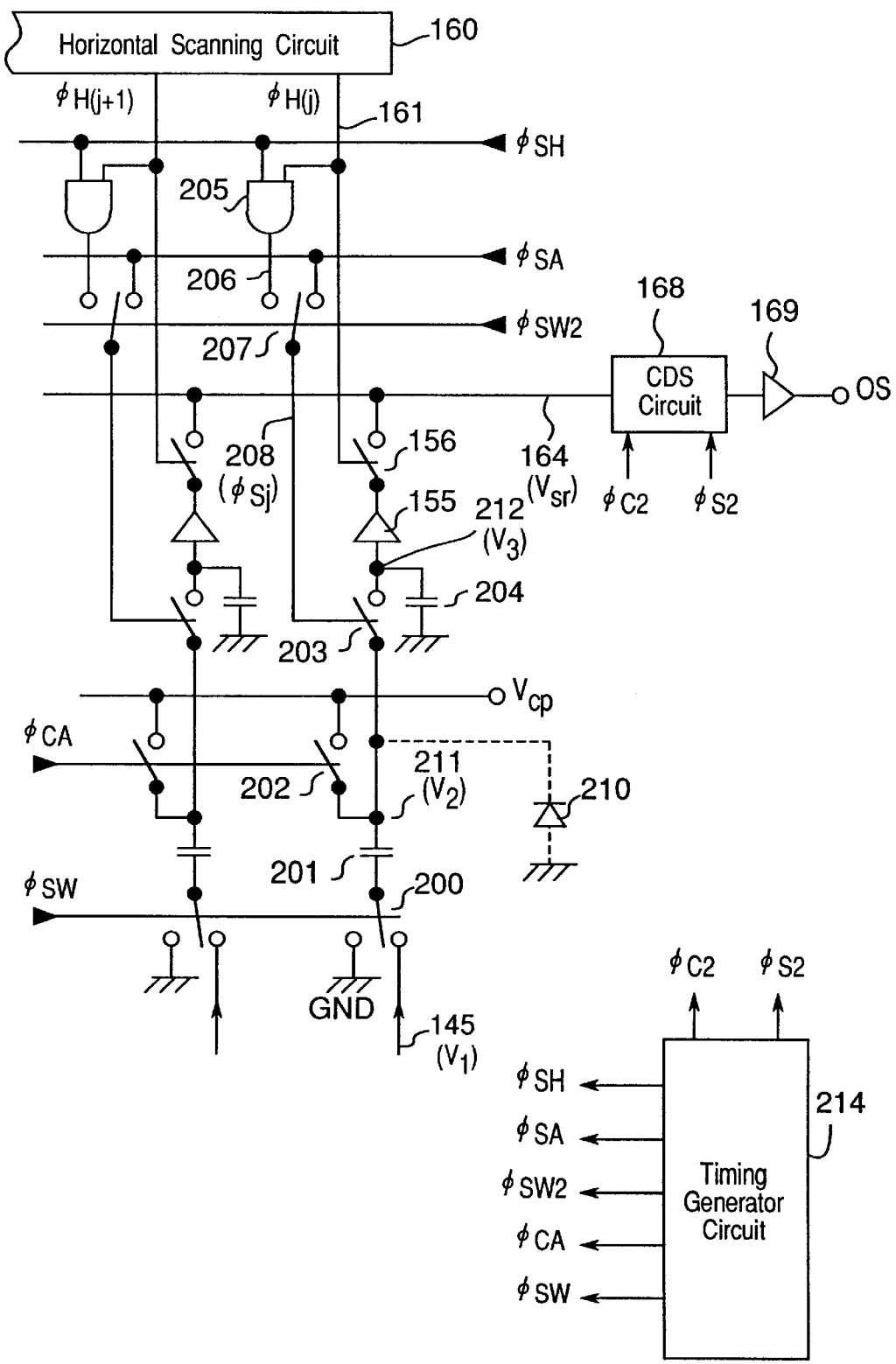
FIG. 4 is a circuit diagram of an amplification type solid state imaging device according to a second embodiment of the present invention.
Figure 17:
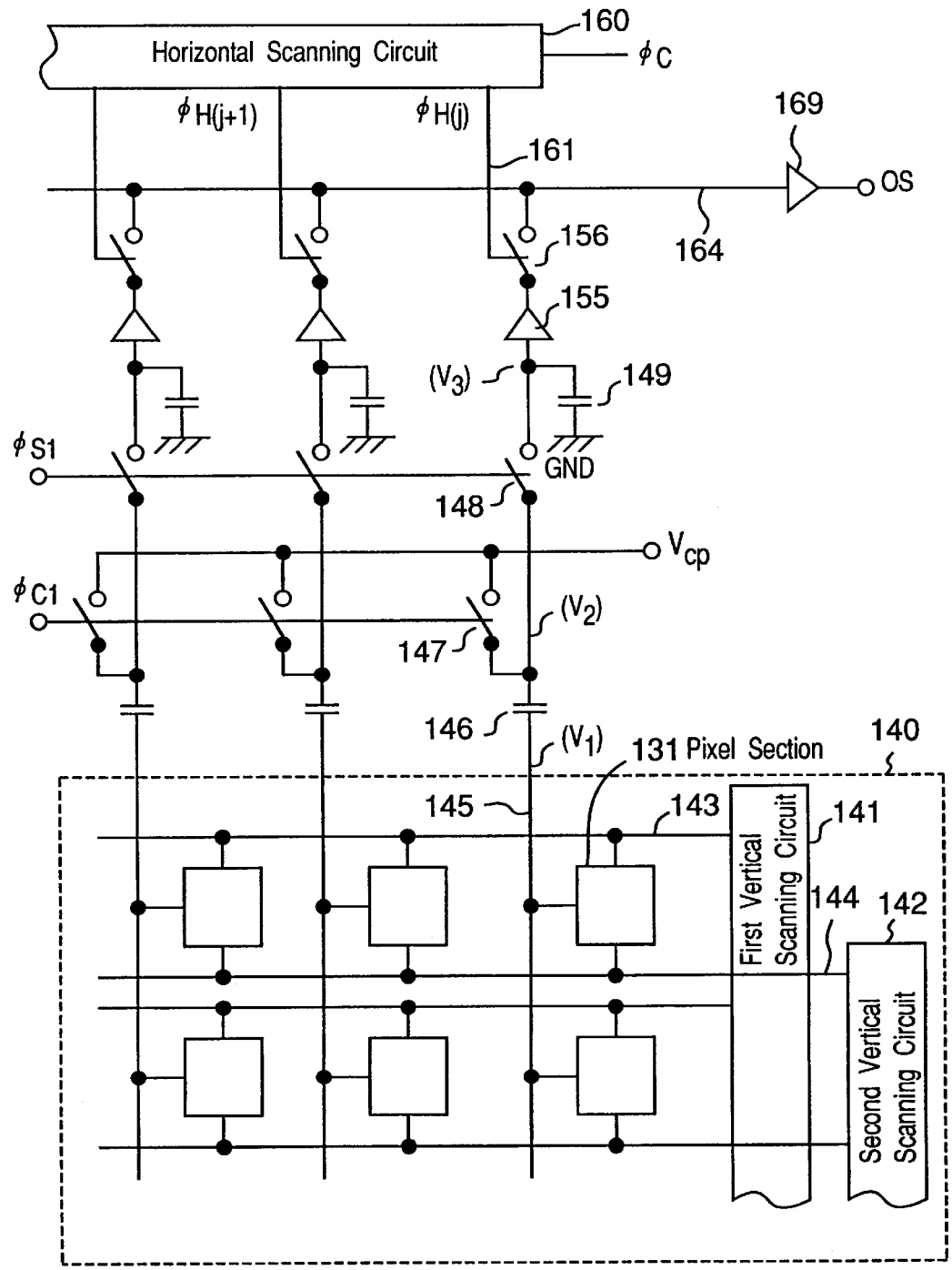
FIG. 17 is a circuit diagram showing a conventional amplification type solid state imaging device.
Figure 18:
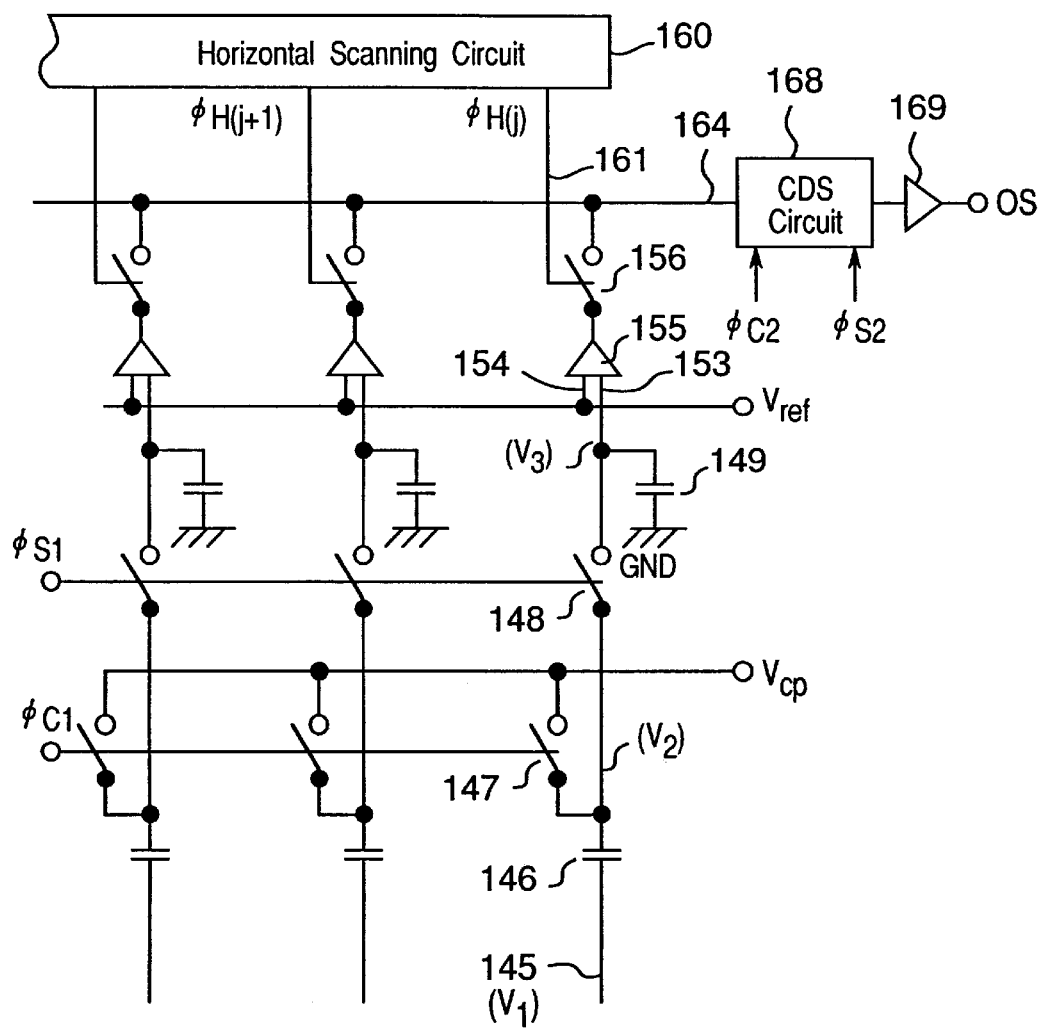
FIG. 18 is a circuit diagram showing another conventional amplification type solid state imaging device.
Figure 19:
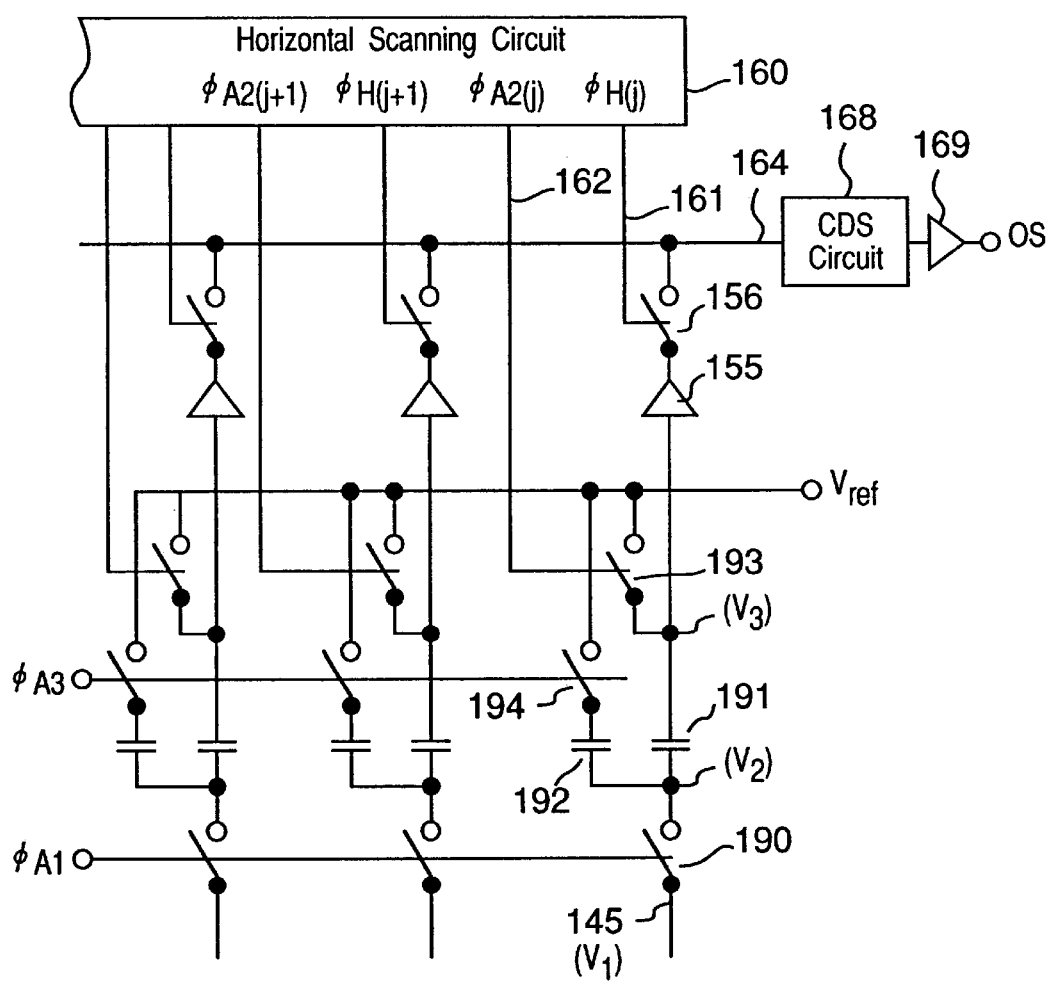
FIG. 19 is a circuit diagram showing another conventional amplification type solid state imaging device.

FIG. 4 shows a circuit diagram of an amplification type solid state imaging device of the second embodiment of the present invention. In FIG. 4, a two-dimensional pixel region has the same construction as that of the two-dimensional pixel region 140 shown in FIG. 17. Therefore, neither illustration nor description is provided for the two-dimensional pixel region, and the circuit of the signal path subsequent to the vertical signal line 145 will be described below. It is to be noted that this amplification type solid state imaging device has the same components as that of the correlated double sampling circuit shown in FIG. 1 except for a timing generator circuit, and the same reference numerals are given to the same components with no description provided for them.

In the amplification type solid state imaging device shown in FIG. 4, one end of the signal line 212 is connected to the sample hold switch 203 and the other end of the signal line 212 is connected to the output terminal of the amplifier circuit 155 that serves as an amplifying means. An output terminal of the amplifier circuit 155 is connected to a horizontal signal line 164 via a horizontal selection switch 156. The output line 161 from a horizontal scanning circuit 160 is connected to a control input terminal of the horizontal selection switch 156. An output terminal of a sample hold changeover switch 207 is connected to the control input terminal of the sample hold switch 203. A pulse $\Phi_{SA}$ that serves as a first control signal is inputted to one input of the sample hold changeover switch 207, while an output terminal of an AND (logical product) circuit 205 is connected via a signal line 206 to the other input terminal of the sample hold changeover switch 207. A pulse $\Phi_{SH}$ is inputted to one input terminal of the AND circuit 205, while a pulse $\Phi_H(j)$ is inputted as a second control signal from the horizontal scanning circuit 160 to the other terminal of the AND circuit 205 via the output line 161, and a pulse $\Phi_{Sj}$ (indicated at 208) is outputted from the AND circuit 205. The input terminal of the CDS circuit 168 is connected to the input terminal of the amplifier circuit 169.

The signal OS is outputted from the amplifier circuit 169. It is to be noted that this amplification type solid state imaging device has a timing generator circuit 214 that serves as a control means for outputting the pulses $\Phi_{SH}$, $\Phi_{SA}$, $\Phi_{SW2}$, $\Phi_{CA}$ and $\Phi_{SW}$, a clamping pulse $\Phi_{C2}$ and a sample hold pulse $\Phi_{S2}$.

In FIG. 4, the input changeover switch 200 of the correlated double sampling circuit provided for each vertical signal line 145 is controlled by the pulse $\phi_{SW}$ so as to conduct the signal of the vertical signal line 145 or the fixed potential to the sample hold switch 203 via the input changeover switch 200 and the clamping capacitor 201. Then, the clamping switch 202 is controlled by the pulse $\phi_{CA}$ so as to connect the output side of the clamping capacitor 201 via the clamping switch 202 to the clamping potential $V_{CP}$ for the execution of a clamping operation. Next, the sample hold switch 203 is controlled by the pulse $\phi_{Sj}$ so as to hold the signal from the sample hold switch 203 in the sample hold capacitor 204 for the execution a sample hold operation. Then, the signal held in the sample hold capacitor 204 is amplified by the amplifier circuit 155, and the amplified signal is conducted to the horizontal signal line 164 via the horizontal selection switch 156. Then, the signal conducted to the horizontal signal line 164 is processed by the CDS circuit 168, and thereafter the signal OS is outputted from the amplifier circuit 169.

Figure 5:
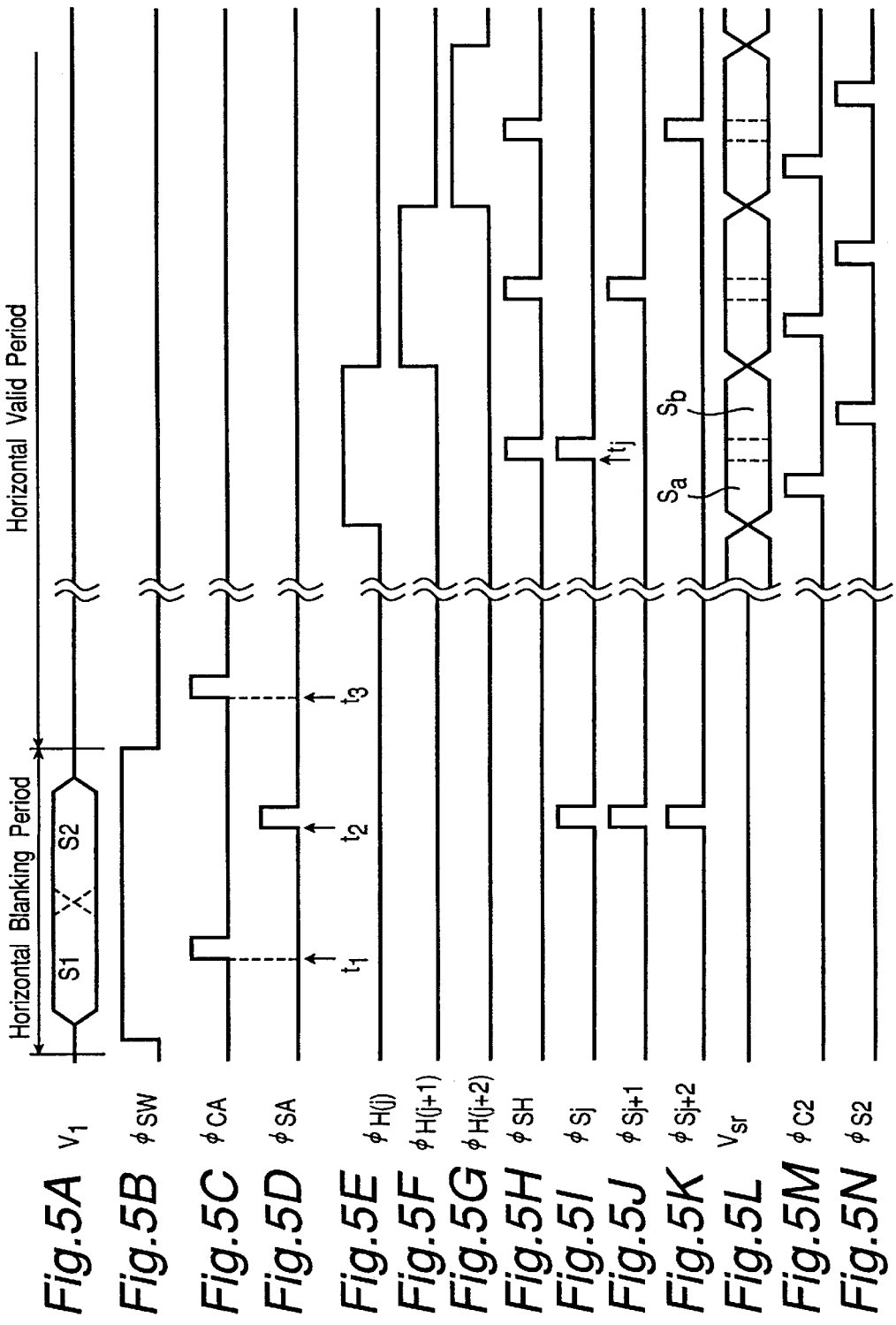
FIGS. 5A through 5N are timing charts showing the timing of each signal of the above amplification type solid state imaging device.

The operation of the amplification type solid state imaging device having the aforementioned construction is indicated by the timing charts of FIGS. 5A through 5N. As shown in FIGS. 5A through 5N, by making the pulse $\phi_{SW}$ have high level within the horizontal blanking period that serves as the first period (shown in FIG. 5B), the clamping capacitor 201 is connected to the vertical signal line 145 via the input changeover switch 200. Then, the pulse $\phi_{CA}$ is made to have high level (shown in FIG. 5C) at the time $t_1$ within one reading period (indicated by $S_1$ in the signal $V_1$ of FIG. 5A) of either the light-receiving signal from the pixel or the reference signal, for the execution of a clamping operation to the clamping potential. The pulse $\phi_{SA}$ is made to have high level (shown in FIG. 5D) at the time $t_2$ within the other reading period (indicated by $S_2$ in the signal $V_1$ of FIG. 5A) of either the light-receiving signal from the pixel element (not shown) or the reference signal, for the execution of a sample hold operation. Through the above operations, a difference between the light-receiving signal from the pixel element and the reference signal is held in the sample hold capacitor 204.

Next, by making the pulse $\phi_{SW}$ have low level (shown in FIG. 5B) at the end of the horizontal blanking period, connecting the input changeover switch 200 to the fixed potential (ground GND) and thereafter turning on again the clamping input changeover switch 200 by the pulse $\phi_{CA}$ at the time $t_3$, the clamping potential $V_{CP}$ is held on the output side of the clamping capacitor 201. In the horizontal valid period that serves as the second period, the switches 156 are made sequentially conductive for each vertical signal line 145 by the pulses $\phi_H(j)$, $\phi_H(j+1)$, $\phi_H(j+2)$, . . . (shown in FIGS. 5E through 5G) so as to read the output of the amplifier circuit 155 to the horizontal signal line 164. At a time $t_J$ (j=4, 5, . . . ) in the middle of each reading period, the sample hold switch 203 executes the second sampling operation by pulses $\phi_S(j)$, $\phi_S(j+1)$, $\phi_S(j+2)$ (shown in FIGS. 5I through 5K) based on the pulses $\phi_H(j)$, $\phi_H(j+1)$, $\phi_H(j+2)$, . . . and the pulse $\phi_{SH}$ (shown in FIG. 5H). By this operation, a signal $V_{Sr}$ outputted from each amplifier circuit 155 to the horizontal signal line 164 becomes a signal that represents the difference between the light-receiving signal from the pixel element and the reference signal by the quantity of change from the clamping potential $V_{CP}$ in the first half and becomes the clamping potential $V_{CP}$ (shown in FIG. 5L) held in the clamping capacitor 200 in the latter half. These are represented by the first output signal $S_a$ and the second output signal $S_b$ in FIG. 5L. Subsequently, a difference between the first output signal $S_a$ and the second output signal $S_b$ is obtained by the clamping pulse $\phi_{C2}$ and the sample hold pulse $\phi_{S2}$ to the CDS circuit 168 (shown in FIGS. 5M and 5N), and the signal OS is outputted via the buffer amplifier circuit 169.

The amplification type solid state imaging device of the second embodiment of the present invention has operations and effects similar to those of the correlated double sampling circuit of the first embodiment. That is, by replacing the input signal $V_{in}$, the signal $V_m$ of the signal line 211 and the signal $V_{out}$ of the signal line 212 in FIG. 1 of the first embodiment with $V_1$, $V_2$ and $V_{Sr}$, respectively, the first and second output signals $S_a$ and $S_b$ on the horizontal signal line 164 are expressed by the equation (4) and equation (5) similarly to the case of FIG. 2. Therefore, if the difference between the first output signal $S_a$ and the second output signal $S_b$ is taken by the CDS circuit 168 provided for the horizontal signal line 164, then the signal OS is expressed as:

$$OS = S_a - S_b = kV_s$$

similarly to the equation (6). Consequently, only the net signal $V_S$ from which the variations between the amplifier circuits 155, the feedthrough level $\Delta V_{CP}$ of the clamping pulse, the feedthrough level $\Delta V_{SH}$ of the sample hold pulse and the potential drop $\Delta V_{drp}$ due to the leak current are removed can be obtained. That is, an image signal of a very high image quality from which the FPN is almost completely removed can be obtained.

A method for coinciding the potential drop of the signal $V_2$ of the signal line 211 with the potential drop of the signal $V_3$ of the signal line 212 in order to completely remove the potential drop $\Delta V_{drp}$ due to the leak current is the same as in the case of FIG. 3. That is, if the ratio of the junction area to the gate area is made roughly identical with regard to the signal line 211 (signal $V_2$) and the signal line 212 (signal $V_3$), then $\Delta V_{drp}$ is completely removed. If the signal line 211 (signal $V_2$) has the smaller ratio of the junction area than the signal line 212 (signal $V_3$), then there is needed a dummy junction 210 (indicated by the dashed line) in order to make the ratios of the junction areas to the gate areas roughly equal to each other.

As described above, the difference between the light-receiving signal of the pixel element and the reset signal is obtained on the input side of the amplifier circuit 155 of each vertical signal line 145 through the first CDS operation in the horizontal blanking period that serves as the first period. Thereafter, the reference signal (clamping potential) including the same feedthrough level as in the first CDS operation is inputted to the amplifier circuit 155 through the second CDS operation in the horizontal valid period that serves as the second period. Thereafter, the difference between the differential signal and the reference signal is taken through the CDS operation of the CDS circuit 168 connected to the terminal of the horizontal signal line 164. Through the above operations, only the net signal component in which all the feedthrough levels are canceled can be obtained. Therefore, the FPN accompanying the horizontal pixel selection can be remarkably reduced with a simple construction and the shading-like nonuniformity can be reduced, allowing an amplification type solid state imaging device capable of obtaining a high-quality image to be provided.

Third Embodiment

Figure 6:
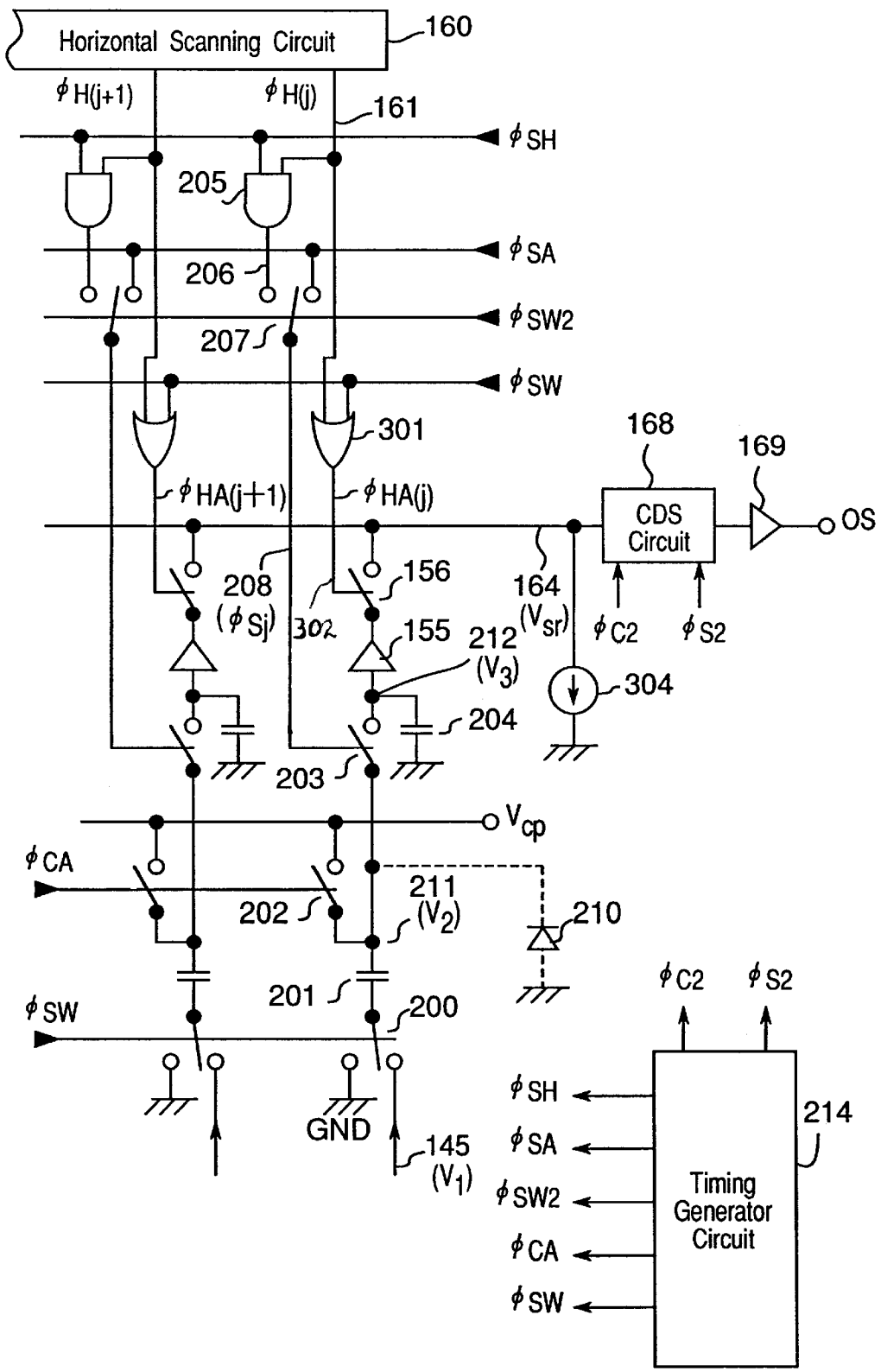
FIG. 6 is a circuit diagram of an amplification type solid state imaging device according to a third embodiment of the present invention.

FIG. 6 shows a circuit diagram of an amplification type solid state imaging device of the third embodiment of the present invention. This amplification type solid state imaging device has the same construction as that of the amplification type solid state imaging device of the second embodiment except for a logical sum circuit 301, and the same components are denoted by the same reference numerals with no description provided for them. Although not shown in FIG. 4 of the second embodiment, a constant current load 304 is connected across the horizontal signal line 164 and the ground GND as shown in FIG. 6.

As shown in FIG. 6, the logical sum circuit 301 is added to the output line 161 extending from the horizontal scanning circuit 160, and the signal line 161 is connected to one input terminal of the logical sum circuit 301. A pulse $\phi_{SW}$ is inputted to the other input terminal of the logical sum circuit 301, and an output terminal of the logical sum circuit 301 is connected to a signal line 302. Then, the logical sum circuit 301 calculates the logical sum of the pulse ($\phi_H(j)$, $\phi_H(j+1)$, ...) of the signal line 161 and the pulse $\phi_{SW}$ and inputs a pulse ($\phi_{HA}(j)$, $\phi_{HA}(j+1)$, ...) that represents the result of calculation to the control input terminal of the horizontal selection switch 156 via the signal line 302.

Figure 7:
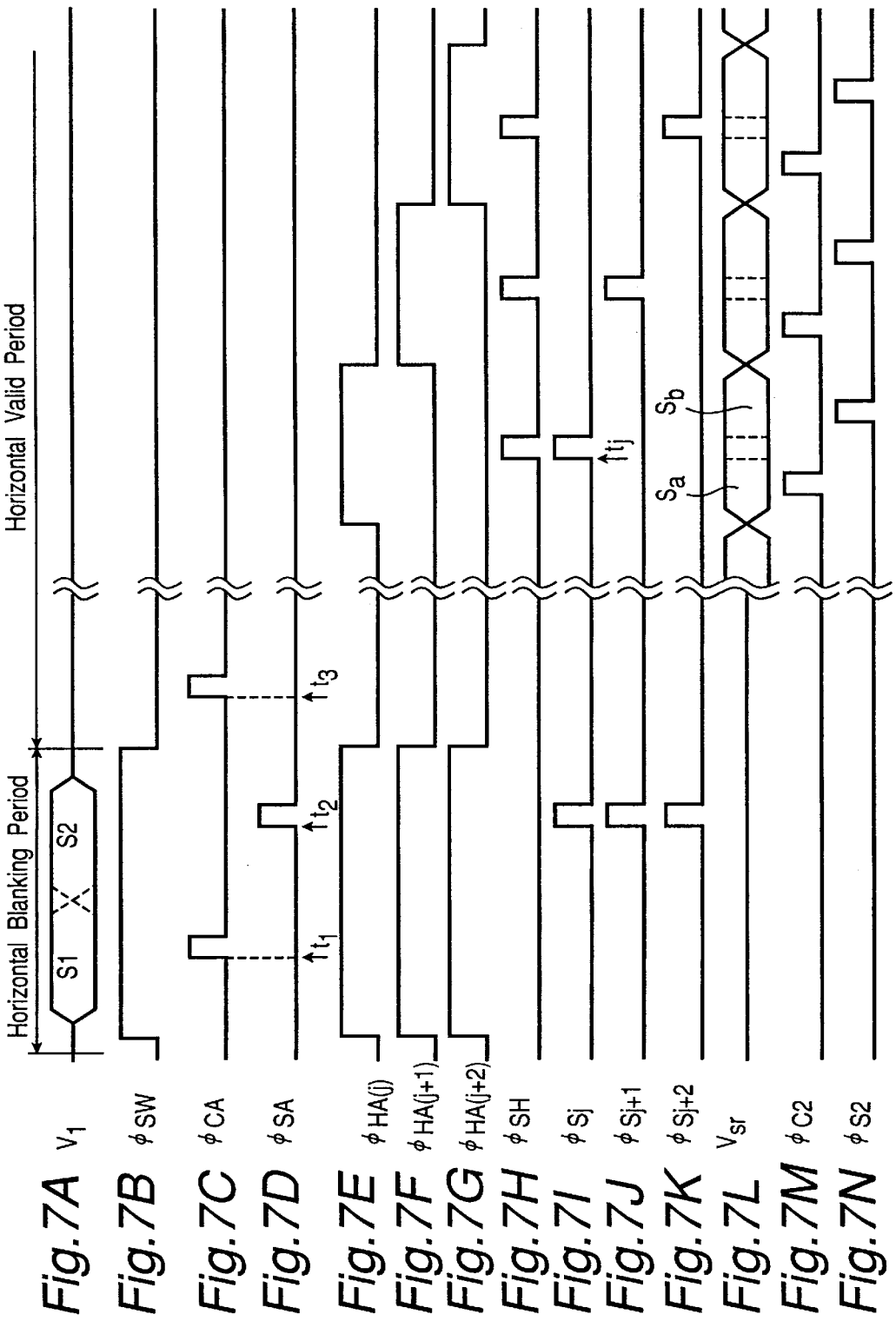
FIGS. 7A through 7N are timing charts showing the timing of each signal of the above amplification type solid state imaging device.

The operation of the above amplification type solid state imaging device is shown in the timing charts of FIGS. 7A through 7N. FIGS. 7A through 7N differ from FIGS. 5A through 5N of the second embodiment only in the pulses $\phi_{HA}(j)$, $\phi_{HA}(j+1)$ ... That is, these pulses $\phi_{HA}(j)$, $\phi_{HA}(j+1)$, ..., each obtained by taking the logical sum of each of the pulses $\phi_H(j)$, $\phi_H(j+1)$, ... and the pulse $\phi_{SW}$, have the waveforms shown in FIGS. 7E through 7G. Therefore, the horizontal selection switches 156 that read the signals of the amplifier circuits 155 to the horizontal signal line 164 are concurrently turned on in the first period (horizontal blanking period) and sequentially turned on in the second period (horizontal valid period). This means the existence of the following characteristics when observed from the CDS circuit side.

The amplification type solid state imaging device of the present third embodiment is characterized in that a total of two sample hold operations, including one operation in the first period and one operation in the second period, are executed every vertical signal line 145. That is, as shown in FIGS. 7I through 7K, the sample hold switches 203 are respectively turned on two times. In this stage, a difference between the pixel signal and the reference signal is held at the first time, and a clamp potential signal is held as a reference signal at the second time. Therefore, same conditions should preferably be provided as far as possible in the two operations. In the case of the second embodiment shown in FIG. 4 and FIGS. 5A through 5N, the horizontal selection switch 156 is turned off in the first sample hold operation, and the horizontal selection switch 156 is turned on in the second sample hold operation, meaning that the state on the load side of the sample hold switch 203 has been varied. In contrast to this, according to this third embodiment, the horizontal selection switch 156 is turned on in each of the first and second sample hold operations. In either case, the output of the amplifier circuit 155 is connected to the horizontal signal line 164 via the horizontal selection switch 156, providing an identical state on the load side of the sample hold switch 203. For example, in the case where the amplifier circuit 155 is a source follower circuit, the horizontal selection switch 156 is turned on or off so that the input gate capacitance of the amplifier circuit 155 largely changes. The input gate capacitance is increased as a consequence of the formation of a channel under the input gate when the switch is turned on, while the input gate capacitance is reduced as a consequence of the formation of no channel when the switch is turned off. That is, the operating conditions are completely identical in the two operations because the horizontal selection switch 156 is on. With this arrangement, FPN and shading-like nonuniformity can be more completely reduced.

Although the horizontal selection switches 156 are concurrently turned on in the first period (horizontal blanking period) in the third embodiment, it is proper to concurrently turn on the horizontal selection switches 156 in the period during which at least the sample hold switch 203 is turned on within the first period.

Fourth Embodiment

Figure 8:
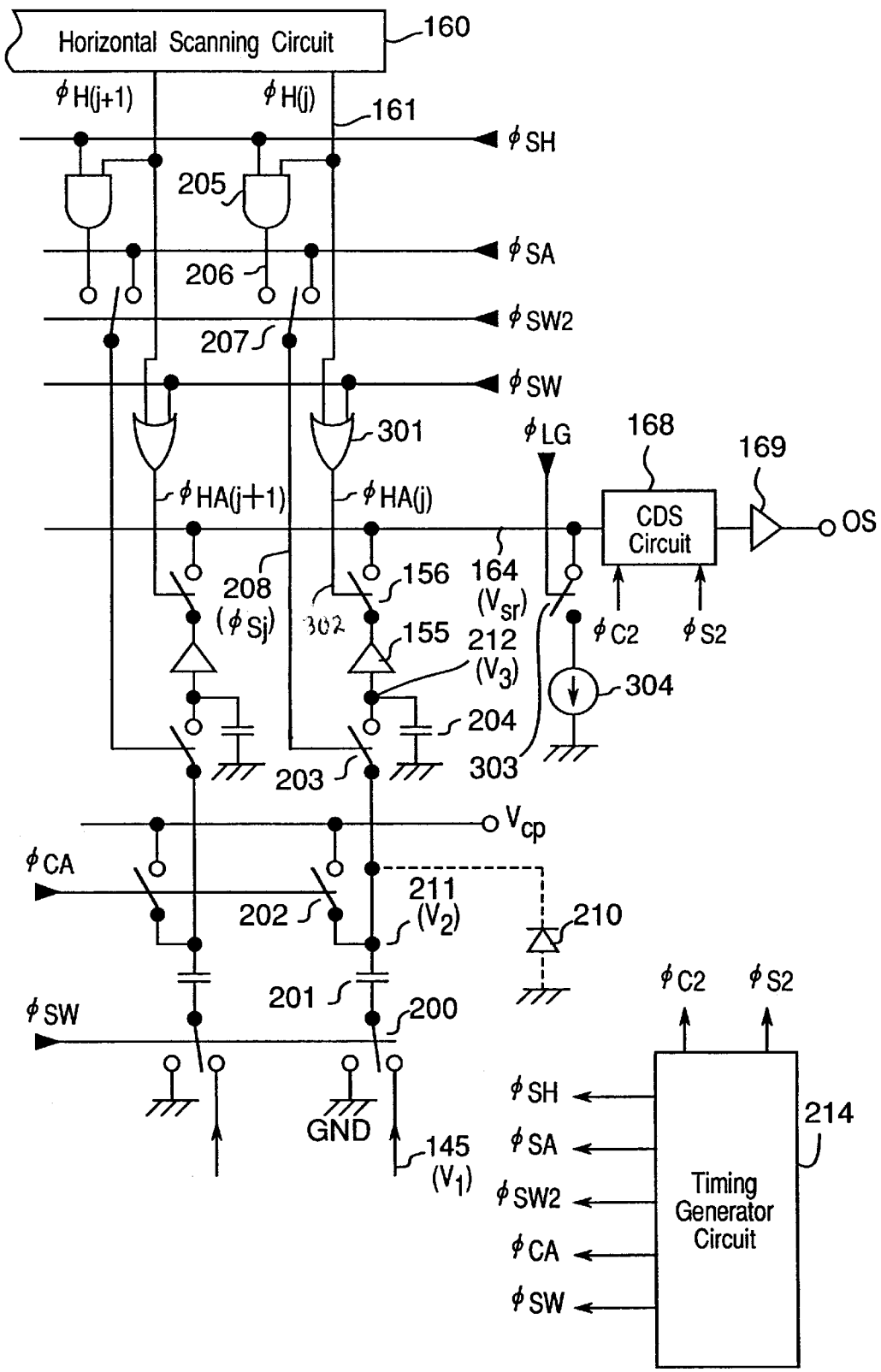
FIG. 8 is a circuit diagram of an amplification type solid state imaging device according to a fourth embodiment of the present invention.

FIG. 8 shows a circuit diagram of an amplification type solid state imaging device of the fourth embodiment of the present invention. This amplification type solid state imaging device has the same construction as that of the amplification type solid state imaging device of the third embodiment except for a load connection switch 303 for a constant current load 304, and the same components are denoted by the same reference numerals with no description provided for them.

As shown in FIG. 8, the constant current load 304 is connected via the load connection switch 303 across the horizontal signal line 164 and the ground GND. A pulse $\phi_{LG}$ is inputted to the control input terminal of the load connection switch 303.

Figure 9:
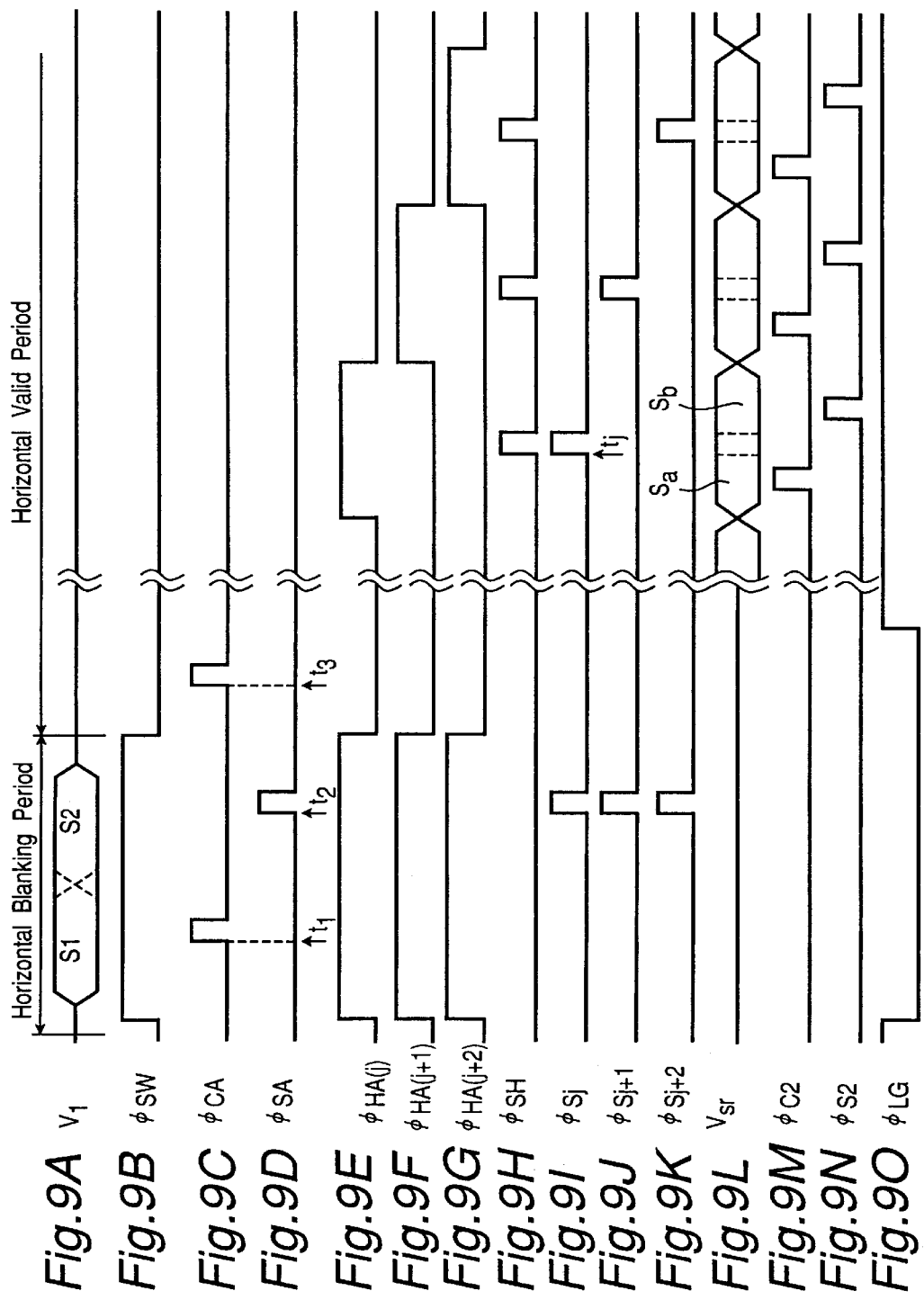
FIGS. 9A through 9O are timing charts showing the timing of each signal of the above amplification type solid state imaging device.

The operation of the above amplification type solid state imaging device is shown in the timing chart of FIGS. 9A through 9O. FIGS. 9A through 9O differ from FIGS. 5A through 5N of the second embodiment only in that the pulse $\phi_{LG}$ for driving the load connection switch 303 is added. That is, in the period during which the horizontal selection switches 156 are concurrently turned on by the pulses $\phi_{HA}(j)$, $\phi_{HA}(j+1)$, ... within the horizontal blanking period, the pulse $\phi_{LG}$ is turned off and the load connection switch 303 is turned off, consequently flowing no current through the horizontal signal line 164 by the constant current load 304. In the period during which the horizontal selection switches 156 are turned on by the pulses $\phi_{HA}(j)$, $\phi_{HA}(j+1)$, ..., within the horizontal valid period, the pulse $\phi_{LG}$ is turned on and the load connection switch 303 is turned on, consequently flowing a current through the horizontal signal line 164 by the constant current load 304.

As already described above, according to the present fourth embodiment, same conditions should preferably be provided as far as possible in the two operations. In the case of the third embodiment shown in FIG. 6, the outputs of all the amplifier circuits 155 are concurrently connected to the horizontal signal line 164 via the horizontal selection switches 156 in the first sample hold operation. In the meanwhile, the load current due to the constant current load 304 is constant, and therefore, a mutual interference may be generated if a great difference in level exists in the outputs on the amplifier circuit sides. For this reason, according to the third embodiment, it is sometimes the case where the hold capacitance 204 on the input side of the amplifier circuit 155 may be influenced, possibly causing difficulties in executing independent sample hold operation in each column.

In contrast to this, according to the amplification type solid state imaging device of the present fourth embodiment, as shown in FIG. 8 and FIGS. 9A through 9O, no load current flows due to the constant current load 304 by turning off the load connection switch 303 when the outputs of all the amplifier circuits 155 are concurrently connected to the horizontal signal line 164 via the horizontal selection switches 156 in the first sample hold operation. Accordingly, no mutual interference occurs even when a great difference in level exists between the amplifier circuits 155. Therefore, no influence is exerted on the hold capacitance 204 on the input side of the amplifier circuit 155, allowing independent sample hold operation to be operated in each column. That is, the correct sample hold operation can be executed in the two operations, by which FPN and shading-like nonuniformity can be more completely reduced.

Fifth Embodiment

Figure 10:
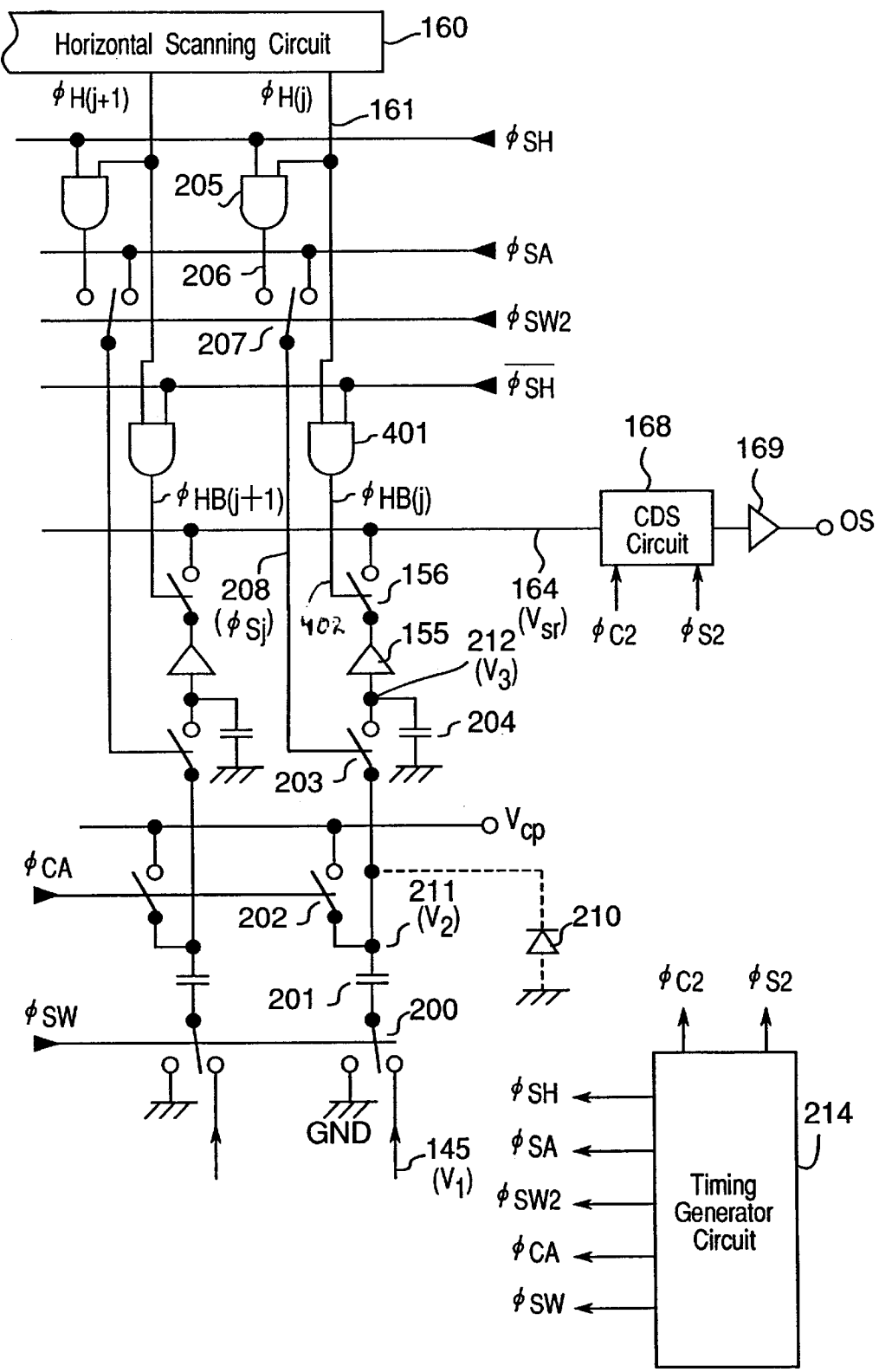
FIG. 10 is a circuit diagram of an amplification type solid state imaging device according to a fifth embodiment of the present invention.

FIG. 10 shows a circuit diagram of an amplification type solid state imaging device of the fifth embodiment of the present invention. This amplification type solid state imaging device has the same construction as that of the amplification type solid state imaging device of the second embodiment except for an AND circuit 401, and the same components are denoted by the same reference numerals with no description provided for them.

As shown in FIG. 10, the AND circuit 401 is added to the output line 161 extending from the horizontal scanning circuit 160. The signal line 161 is connected to one input terminal of the AND circuit 401, an inverted signal of the pulse $\phi_{SH}$ is inputted to the other input terminal of the AND circuit 401, and the output terminal of the AND circuit 401 is connected to the signal line 402. Then, the AND circuit 401 calculates the logical product of the pulse ($\phi_H(j)$, $\phi_H(j+1)$, ... ) of the signal line 161 and the inverted signal of the pulse $\phi_{SH}$ and inputs pulses $\phi_{HB}(j)$, $\phi_{HB}(j+1)$, ... that represent the result of calculation to the control input terminal of the horizontal selection switch 156 via the signal line 402.

Figure 11:
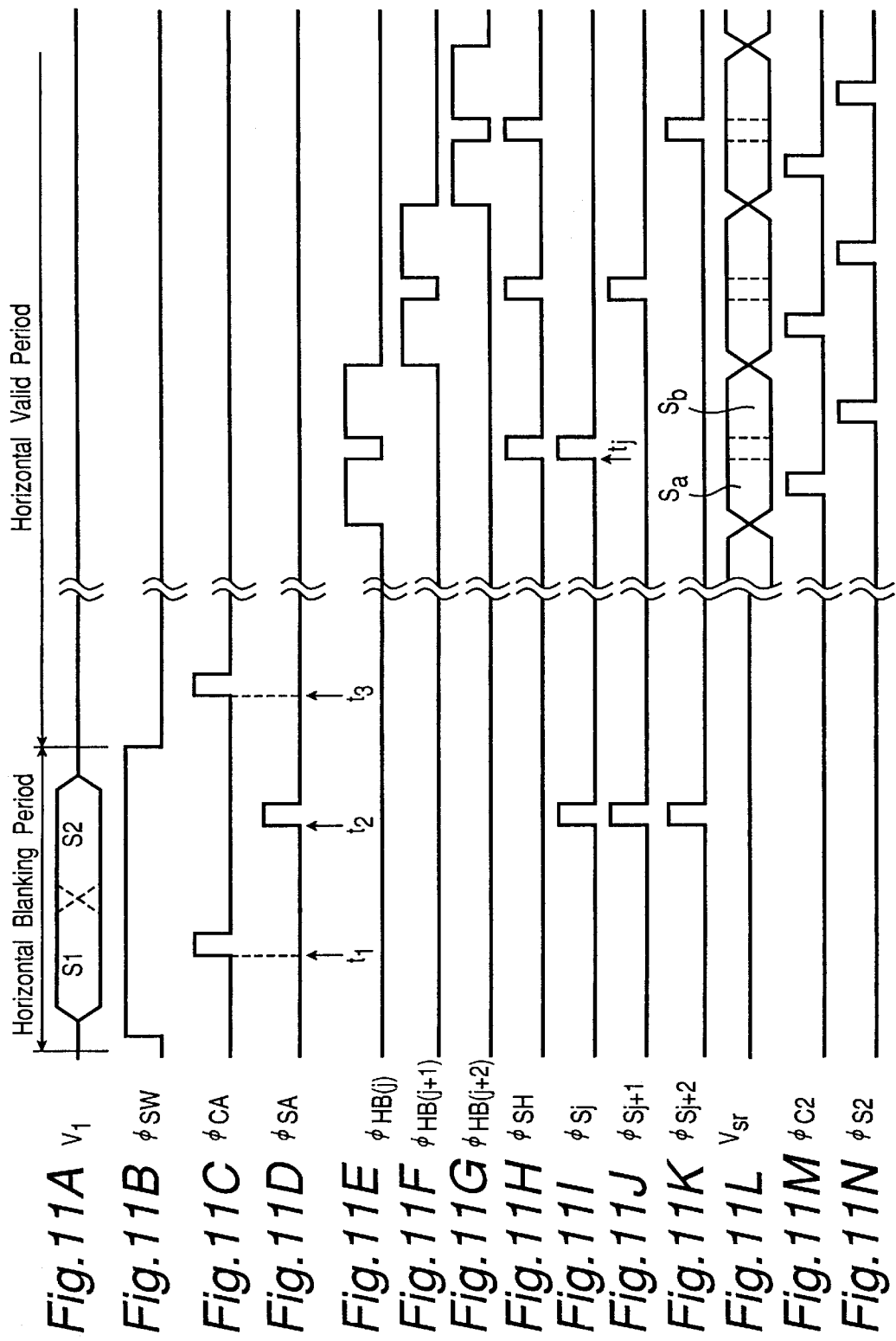
FIGS. 11A through 11N are timing charts showing the timing of each signal of the above amplification type solid state imaging device.

The operation of the above amplification type solid state imaging device is shown in the timing chart of FIGS. 11A through 11N. FIGS. 11A through 11N differ from FIGS. 5A through 5N of the second embodiment only in the pulses $\phi_{HB}(j)$, $\phi_{HB}(j+1)$, ... That is, these signals, obtained by taking the logical product of each of the pulses $\phi_H(j)$, $\phi_H(j+1)$, ... and the inverted signal of the pulse $\phi_{SH}$, have the waveforms shown in FIGS. 11E through 11G. Therefore, the horizontal selection switches 156 that read the signals of the amplifier circuits 155 to the horizontal signal line 164 are turned off in the first period (horizontal blanking period) and turned off only when the sample hold switch 203 is turned on while being sequentially turned on in the second period (horizontal valid period). This means the existence of the following characteristics when observed from the CDS circuit side, similarly to the cases of FIG. 6 and FIG. 8.

As already described above, according to the present fifth embodiment, same conditions should preferably be provided as far as possible in the two operations. In FIG. 10 and FIGS. 11A through 11N, the horizontal selection switch 156 is turned off in each of the first and second operations during which the sample hold switch 203 is turned on. In either case, the output of the amplifier circuit 155 is not connected to the horizontal signal line 164 via the horizontal selection switch 156, and the state on the load side of the sample hold switch 203 becomes identical. That is, the operating conditions become completely identical in each of the two operations so long as the horizontal selection switch 156 is off. With this arrangement, FPN and shading-like nonuniformity can be more completely reduced.

Figure 12:
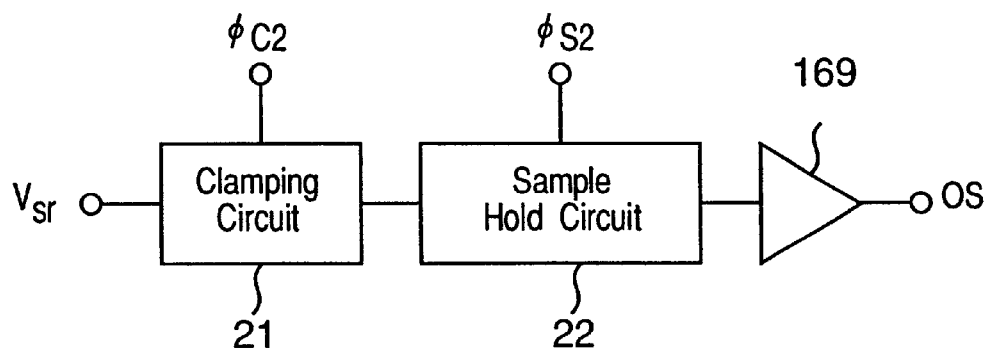
FIG. 12 is a block diagram of a correlated double sampling circuit obtained by combining a clamping circuit with a sample hold circuit.
Figure 13:
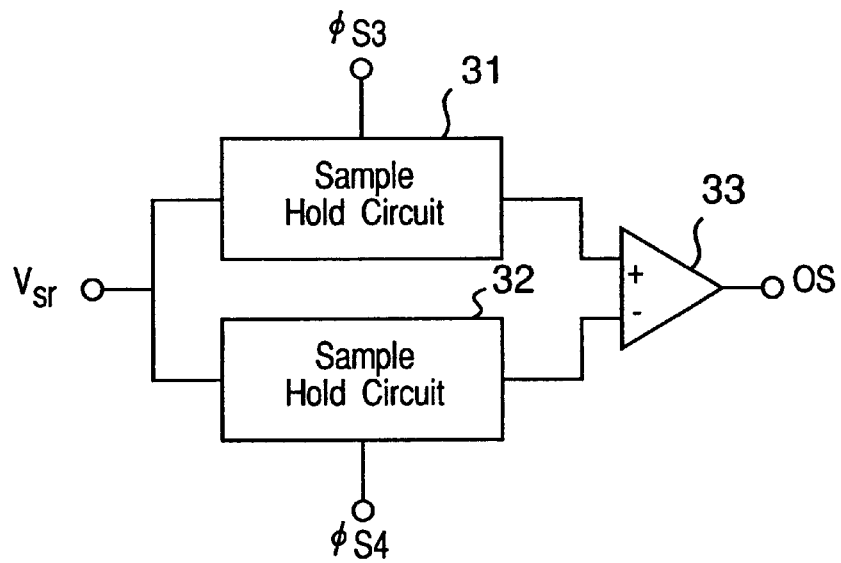
FIG. 13 is a block diagram of a correlated double sampling circuit obtained by combining two sample hold circuits with each other.
Figure 14:
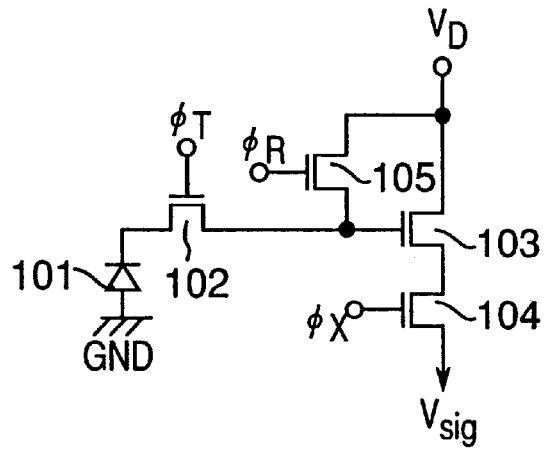
FIG. 14 is a circuit diagram showing an example of a conventional horizontal type pixel.
Figure 15:
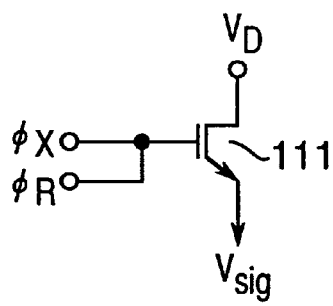
FIG. 15 is a circuit diagram showing an example of a conventional vertical type pixel.
Figure 16:
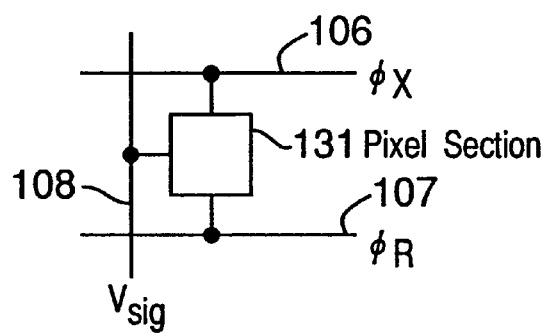
FIG. 16 is a block diagram schematically showing the circuit of FIG. 14 and FIG. 15.

FIG. 12 and FIG. 13 show the examples of the construction of the CDS circuit 168 shown in FIGS. 4, 6, 8 and 10. FIG. 12 shows a CDS circuit obtained by combining a clamping circuit 21 that serves as the second clamping means into which the signal $V_{SR}$ is inputted with a sample hold circuit 22 that serves as the second sample hold means, where the clamping circuit 21 is controlled by the clamping pulse $\phi_{C2}$ and the sample hold circuit 22 is controlled by the sample hold pulse $\phi_{S2}$. The timing arrangements of the clamping pulse $\phi_{C2}$ and the sample hold pulse $\phi_{S2}$ are as shown in FIGS. 5M and 5N. The CDS circuit obtains a signal of difference between a pair of first output signal $S_a$ and second output signal $S_b$ read to the horizontal signal line 164, i.e., a difference between the light-receiving signal from the pixel element and the reference signal. FIG. 13 shows a CDS circuit obtained by combining two sample hold circuits 31 and 32 that serves as the third and fourth sample hold means into which the signal $V_{SR}$ is inputted with a differential amplifier 33 that serves as a calculating means. The sample hold circuits 31 and 32 are controlled by sample hold pulses $\phi_{S3}$ and $\phi_{S4}$, respectively. The timing arrangements of the sample hold pulses $\phi_{S3}$ and $\phi_{S4}$ correspond to $\phi_{C2}$ and $\phi_{S2}$, respectively, of FIGS. 5M and 5N. With the above arrangement for taking the difference between the outputs of the sample hold circuits 31 and 32 by the differential amplifier 33, a differential signal between a pair of first output signal $S_a$ and second output signal $S_b$ read to the horizontal signal line 164, i.e., a difference between the light-receiving signal from the pixel element and the reference signal is obtained. The CDS circuits shown in FIG. 12 and FIG. 13 form a signal of difference between the first output signal $S_a$ and the second output signal $S_b$, allowing the signal OS representing an image free of FPN from which all the variation components are removed to be obtained.

By switching the sample hold changeover switch 207 to the pulse $\phi_{SH}$ side as the first control signal in the latter half of the horizontal blanking period and switching the sample hold changeover switch 207 to the pulse side that serves as the second control signal in the period during which the horizontal selection switch 156 becomes conductive within the horizontal valid period, the sample hold switch 203 can be controlled for each of the vertical signal lines 145 with the input changeover switch 200 that become sequentially conductive with a simple construction.

As is apparent from the above, the correlated double sampling circuit of the present invention holds the net signal as the difference between the first half signal and the latter half signal of the signal in the sample hold capacitor through the first CDS operation by the first clamping means and the first sample hold means in the first period during which the input changeover switch is switched to the signal line side and then obtains the reference signal including the same feedthrough level as that of the first CDS operation in the sample hold capacitor through the second CDS operation by the first clamping means and the first sample hold means in the second period during which the input changeover switch is switched to the fixed potential side.

Therefore, according to the correlated double sampling circuit of the present invention, by taking the difference between the signals held in the sample hold capacitor before and after the second sample hold operation, the noise component of the signal line is removed through the CDS operation, and there can be obtained a very low-noise signal from which the clamping feedthrough level, sample and hold feedthrough level and the potential drop component due to the leak current generated through the CDS operation are removed, producing a great practical effect. Therefore, by applying this correlated double sampling circuit to an amplification type solid state imaging device, the FPN accompanying the horizontal pixel selection can be remarkably reduced with a simple construction and the shading-like nonuniformity can be reduced, allowing a high-quality image free of FPN to be obtained.

According to the correlated double sampling circuit of one embodiment, the capacitance of the clamping capacitor is made ten or more times greater than the capacitance of the sample hold capacitor. With this arrangement, the gain in the case where the signal obtained through the clamping capacitor is accumulated in the sample hold capacitor can be increased.

According to the correlated double sampling circuit of one embodiment, the clamping switch and the sample hold switch are each comprised of a MOS transistor, and the ratio of the area of the junction section of the clamping switch with respect to the capacitance of the clamping capacitor and the ratio of the area of the junction section of the sample hold switch with respect to the capacitance of the sample hold capacitor are made substantially equal to each other. With this arrangement, an equal reduction in potential due to the leak current of the MOS transistor occurs on the signal line between the clamping capacitor and the sample hold capacitor and on the signal line on the output side of the sample hold capacitor. Therefore, the reductions in potential due to the leak currents of the MOS transistors can be reliably cancelled by the aforementioned CDS operation.

The amplification type solid state imaging device of one aspect of the present invention has the photoelectric conversion means, the amplification type pixel element for amplifying and outputting the light-receiving signal formed by the photoelectric conversion means and the reference signal that serves as the reference of the light-receiving signal, the vertical signal line to which the output of the pixel element is connected, the amplifying means for amplifying the signal of the vertical signal line and the horizontal signal line to which the output of the amplifying means is connected via the horizontal selection switch and transmits the signal of the pixel element to the horizontal signal line via the vertical signal line, the amplifying means and the horizontal selection switch, and is provided with the correlated double sampling circuit provided between the vertical signal line and the amplifying means.

Therefore, according to the amplification type solid state imaging device, the clamping feedthrough level and the sample and hold feedthrough level generated through the CDS operation on each vertical signal line as well as the potential drop component due to the leak current can be removed, so that a high-quality image signal from which all the variation components are removed can be obtained. Furthermore, by comparison with the case where a conventional correlated double sampling circuit is provided for each of vertical signal lines, only the input changeover switch is simply added before the clamping capacitor, allowing the area to be also suppressed to a small value.

The amplification type solid state imaging device of one embodiment has the processes of switching the input changeover switch to the signal line side in the first period, clamping either one of the light-receiving signal of the pixel element and the reference signal by the first clamping means in the first half of the first period, subsequently holding the signal that represents the difference between the light-receiving signal from the pixel element and the reference signal by a quantity of change from the clamping potential in the sample hold capacitor by sampling and holding the other one of the light-receiving signal from the pixel element and the reference signal in the latter half of the first period by the first sample hold means via the clamping capacitor, thereafter switching the input changeover switch to the fixed potential side in the second period, sampling and holding the clamping potential on the output side of the clamping capacitor by the first clamping means with respect to the fixed potential in the first half of the second period, subsequently outputting a first output signal that represents the difference between the light-receiving signal from the pixel element and the reference signal by the quantity of change from the clamping potential to the horizontal signal line via the amplifying means in the first half of the period during which the horizontal selection switch becomes conductive to read the output signal of the amplifying means to the horizontal signal line, subsequently sampling and holding the signal on the output side of the clamping capacitor by the first sample hold means, outputting a second output signal that represents the clamping potential to the horizontal signal line in the latter half of the period during which the horizontal selection switch becomes conductive after the sample hold operation and taking the difference between the first and second output signals, the difference between the light-receiving signal and the reference signal can be obtained.

The amplification type solid state imaging device of one embodiment is constructed of the second clamping means for clamping the first output signal out of a pair of first output signal and second output signal from the horizontal signal line and outputting the signal of difference between the first output signal and the second output signal in the period of the second output signal and the second sample hold means for sampling and holding the differential signal from the second clamping means and outputting the differential signal that has been sampled and held. With the above construction, the signal of difference between a pair of first output signal and second output signal to be read to the horizontal signal line, i.e., the difference between the light-receiving signal from the pixel element and the reference signal can be obtained, as a consequence of which the signal that represents an image free of FPN from which all the variation components are removed can be obtained.

The amplification type solid state imaging device of one embodiment has a construction in which the difference between the outputs of the third and fourth sample hold circuits for sampling and holding the first output signal and the output of the fourth sample hold circuit for sampling and holding the second output signal by the calculating means. With the above construction, the signal of difference between a pair of first output signal and second output signal to be read to the horizontal signal line, i.e., the difference between the light-receiving signal from the pixel element and the reference signal is obtained, as a consequence of which the signal that represents an image free of FPN from which all the variation components are removed can be obtained.

According to the amplification type solid state imaging device of one embodiment, by switching the sample hold changeover switch to the first control signal side from the control means in the latter half of the first period and switching the sample hold changeover switch to the second control signal side from the control means in the period during which the horizontal selection switch becomes conductive within the second period, the sample hold switch of the first sample hold means can be controlled for each of the vertical signal lines of which the horizontal selection switches are made sequentially conductive, with a simple construction.

According to the correlated double sampling circuit of one embodiment, the clamping switch and the sample hold switch are each comprised of a MOS transistor, and the ratio of the area of the junction section of the MOS transistor of the sample hold switch with respect to the area of the gate section of the MOS transistor and the ratio of the area of the junction section of the MOS transistor of the clamping switch with respect to the area of the gate section of the MOS transistor are substantially equal to each other. With this arrangement, an equal reduction in potential due to the leak current of the MOS transistor occurs on the signal line between the clamping capacitor and the sample hold capacitor and on the signal line on the output side of the sample hold capacitor. Therefore, the influence of reduction in potential due to the leak current of the MOS transistor can be reliably removed by the aforementioned CDS operation.

According to the correlated double sampling circuit of one embodiment, all the horizontal selection switches are made conductive at least in the period during which the first sample hold means executes sampling and holding within the first period, and the horizontal selection switches connected to the first sample hold means are made conductive in the period during which the first sample hold means samples and holds the signal on the output side of the clamping capacitor within the second period. Therefore, the horizontal selection switches become conductive when the first sample hold means executes sampling and holding in both the first and second periods, and the state on the load side of the first sample hold means becomes identical in the first and second periods, meaning that the same operating conditions are provided in the two operations. Therefore, FPN and shading-like nonuniformity can be more completely reduced.

According to the correlated double sampling circuit of one embodiment, the constant current load that is connected to the horizontal signal line via the load connection switch is provided, and the load connection switch is put in the off state at least in the period during which all the horizontal selection switches are conductive, disconnecting the constant current source from the horizontal signal line. With this arrangement, no leak current flows, and accordingly, no mutual interference is generated even if a great difference in level exists between the outputs of the amplifying means. Therefore, a correct sample hold operation can be executed in each of the two operations without exerting any influence on the sample hold capacitor on the input side of the amplifying means, by which FPN and shading-like nonuniformity can be more completely reduced.

According to the correlated double sampling circuit of one embodiment, all the horizontal selection switches are made nonconductive at least in the period during which the first sample hold means executes sampling and holding within the first period, and the horizontal selection switches connected to the first sample hold means are made nonconductive in the period during which the first sample hold means samples and holds the signal on the output side of the clamping capacitor within the second period. With this arrangement, the horizontal selection switch becomes nonconductive when the first sample hold means executes sampling and holding in both the first and second periods, and the state on the load side of the first sample hold means becomes identical in the first and second periods, meaning that the same operating conditions are provided in the two operations. Therefore, FPN and shading-like nonuniformity can be more completely reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A correlated double sampling circuit comprising:
   an input changeover switch that has one input terminal connected to a signal line and the other input terminal receiving a fixed potential and selects and outputs either a signal of the signal line or the fixed potential;
   a first clamping means having a clamping capacitor that has one terminal on an input side connected to an output terminal of the input changeover switch and a clamping switch that has one terminal connected to the other terminal on an output side of the clamping capacitor and the other terminal to which a clamping potential is applied;
   a first sample hold means having a sample hold switch that has one terminal connected to the terminal of the output side of the clamping capacitor and a sample hold capacitor that has one terminal connected to the other terminal of the sample hold switch; and
   a control means for controlling the input changeover switch, the clamping switch and the sample hold switch so as to switch the input changeover switch to the signal line side in a first period, clamp the signal of the signal line in a first half of the first period by the first clamping means, thereafter sample and hold a signal on the output side of the clamping capacitor in the latter half of the first period by the first sample hold means, switch the input changeover switch to the fixed potential side in a second period subsequent to the first period, sample and hold the clamping potential on the output side of the clamping capacitor by the first clamping means with respect to the fixed potential in the first half of the second period and thereafter sample and hold a signal on the output side of the clamping capacitor by the first sample hold means.

2. A correlated double sampling circuit as claimed in claim 1, wherein
   a capacitance of the clamping capacitor is ten or more times greater than a capacitance of the sample hold capacitor.

3. A correlated double sampling circuit as claimed in claim 1, wherein
   the clamping switch and the sample hold switch are each comprised of a MOS transistor, and
   a ratio of a sum of areas of a junction section of the clamping switch and a junction section of the sample hold switch respectively connected to the clamping capacitor with respect to the capacitance of the clamping capacitor is substantially equal to a ratio of an area of a junction section of the sample hold switch connected to the sample hold capacitor with respect to the capacitance of the sample hold capacitor.

4. An amplification type solid state imaging device that has a photoelectric conversion means, an amplification type pixel element for amplifying and outputting a light-receiving signal formed by the photoelectric conversion means and a reference signal that serves as a reference of the light-receiving signal, a vertical signal line to which an output of the pixel element is connected, an amplifying means for amplifying a signal of the vertical signal line and a horizontal signal line to which an output of the amplifying means is connected via a horizontal selection switch and transmits the signal of the pixel element to the horizontal signal line via the vertical signal line, the amplifying means and the horizontal selection switch, the amplification type solid state imaging device comprising:
   a correlated double sampling circuit claimed in claims 1 provided between the vertical signal line and the amplifying means.

5. An amplification type solid state imaging device as claimed in claim 4, wherein
   the input changeover switch is switched to the vertical signal line in the first period; either one of the light-receiving signal of the pixel element or the reference signal is clamped in the first half of the first period by the first clamping means, thereafter a signal that represents a difference between the light-receiving signal from the pixel element and the reference signal by a quantity of change from the clamping potential is held on sample hold capacitor by sampling and holding the other one of the light-receiving signal of the pixel element and the reference signal in the latter half of the first period via the clamping capacitor by the first sample hold means, and wherein the input changeover switch is switched to the fixed potential side in the second period, the clamping potential is sampled and held on the output side of the clamping capacitor by the first clamping means with respect to the fixed potential in the first half of the second period, thereafter a first output signal that represents a difference between the light-receiving signal from the pixel element and the reference signal by a quantity of change from the clamping potential is outputted to the horizontal signal line via the amplifying means in the first half of the period during which the horizontal selection switch is made conductive and the output signal of the amplifying means is read to the horizontal signal line, thereafter the signal on the output side of the clamping capacitor is sampled and held by the first sample hold means and a second output signal that becomes the clamping potential is outputted to the horizontal signal line via the amplifying means in the latter half of the period during which the horizontal selection switch is conductive after the sampling and holding.

6. An amplification type solid state imaging device as claimed in claim 5, comprising:

a second clamping means for clamping the first output signal out of a pair of first output signal and second output signal from the horizontal signal line and outputting a signal of difference between the first output signal and the second output signal in the period of outputting the second output signal; and a second sample hold means for sampling and holding the signal of difference from the second clamping means and outputting the signal of difference that has been sampled and held.

7. An amplification type solid state imaging device as claimed in claim 5, comprising:

a third sample hold means for sampling and holding the first output signal out of a pair of first output signal and second output signal from the horizontal signal line;

a fourth sample hold means for sampling and holding the second output signal out of a pair of first output signal and second output signal from the horizontal signal line; and a calculating means for obtaining a signal of difference between the first output signal held by a third sample hold means and the second output signal held by a fourth sample hold means and outputting the signal of difference.

8. An amplification type solid state imaging device as claimed in claim 5, wherein all the horizontal selection switches are conductive in a period during which the first sample hold means executes sampling and holding within the first period, and the horizontal selection switch connected to the first sample hold means is conductive in a period during which the first sample hold means samples and holds the signal on the output side of the clamping capacitor within the second period.

9. An amplification type solid state imaging device as claimed in claim 8, wherein a constant current load that is connected to the horizontal signal line via a load connection switch is provided, and the load connection switch is off at least in a period during which all the horizontal selection switches are conductive.

10. An amplification type solid state imaging device as claimed in claim 5, wherein all the horizontal selection switches are nonconductive at least in a period during which the first sample hold means executes sampling and holding within the first period, and the horizontal selection switch connected to the first sample hold means is nonconductive in a period during which the first sample hold means samples and holds the signal on the output side of the clamping capacitor within the second period.

11. An amplification type solid state imaging device as claimed in claim 4, wherein the control means outputs a first control signal that is turned on in the latter half of the first period and a second control signal that is turned on in the period during which the horizontal selection switch becomes conductive within the second period, and the imaging device comprises:

a sample hold changeover switch that has one input terminal receiving the first control signal, the other input terminal receiving the second control signal and an output terminal connected to a control input terminal of the sample hold switch of the first sample hold means.

12. A correlated double sampling circuit as claimed in claim 4, wherein the clamping switch and the sample hold switch are each comprised of a MOS transistor, and a ratio of a sum of areas of a junction section of the clamping switch and a junction section of the sample hold switch respectively connected to the clamping capacitor with respect to the capacitance of the clamping capacitor is substantially equal to a ratio of an area of a junction section of the sample hold switch connected to the sample hold capacitor with respect to the capacitance of the sample hold capacitor.

* * * * *